US012253592B2

(12) United States Patent
Gurelli et al.

(10) Patent No.: US 12,253,592 B2
(45) Date of Patent: Mar. 18, 2025

(54) TECHNIQUES FOR INTELLIGENT REFLECTING SURFACE (IRS) POSITION DETERMINATION IN IRS AIDED POSITIONING

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Tao Luo, San Diego, CA (US); Navid Abedini, Basking Ridge, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 17/652,217

(22) Filed: Feb. 23, 2022

(65) Prior Publication Data

US 2023/0266457 A1      Aug. 24, 2023

(51) Int. Cl.
*G01S 13/75*        (2006.01)
*G01S 13/87*        (2006.01)
(Continued)

(52) U.S. Cl.
CPC ............ *G01S 13/75* (2013.01); *G01S 13/876* (2013.01); *H01Q 15/148* (2013.01); *H04B 7/04013* (2023.05)

(58) Field of Classification Search
CPC ............................ G01S 13/75; H01Q 15/148
See application file for complete search history.

(56) References Cited

U.S. PATENT DOCUMENTS 11,546,022 B2    1/2023  Dunna et al.
11,677,145 B1    6/2023  Sharma
(Continued)

FOREIGN PATENT DOCUMENTS

CN      111986741 A     11/2020
CN      113645163 A     11/2021
(Continued)

OTHER PUBLICATIONS

Elmossallamy M.A., et al., "Reconfigurable Intelligent Surfaces for Wireless Communications: Principles, Challenges, and Opportunities", IEEE Transactions on Cognitive Communications and Networking, arXiv:2005.00938v1 [eess.SP], May 2, 2020, pp. 1-12.
(Continued)

*Primary Examiner* — Fabricio R Murillo Garcia
(74) *Attorney, Agent, or Firm* — Dinsmore & Shohl LLP

(57) ABSTRACT

Certain aspects of the present disclosure provide techniques for user equipment (UE) positioning using one or more intelligent reflecting surfaces (IRSs). A method that may be performed by a UE includes for each IRS of the one or more IRSs: identifying a first IRS reflection center, measuring a first impulse response from the IRS to obtain a first measured impulse response representation, determining a first impulse response for a first ray reflected from the first IRS reflection center of the IRS, estimating a first position of the UE based on, at least, the first IRS reflection centers for each of the one or more IRSs and the first impulse responses for each of the one or more IRSs, and estimating a second position of the UE in an iterative manner until one or more conditions are satisfied.

30 Claims, 18 Drawing Sheets

(51) Int. Cl.
*H01Q 15/14* (2006.01)
*H04B 7/04* (2017.01)

(56) References Cited

U.S. PATENT DOCUMENTS

| | | | |
|---|---|---|---|
| 2021/0235477 A1* | 7/2021 | Baldemair | H04L 5/0048 |
| 2021/0243624 A1* | 8/2021 | Moosavi | H04W 24/10 |
| 2022/0014935 A1 | 1/2022 | Haija et al. | |
| 2022/0052764 A1 | 2/2022 | Medra et al. | |
| 2022/0060238 A1 | 2/2022 | Jassal et al. | |
| 2022/0216908 A1 | 7/2022 | Choi et al. | |
| 2022/0231753 A1 | 7/2022 | Bengtsson et al. | |
| 2022/0239530 A1* | 7/2022 | Wagner | H04L 25/0224 |
| 2022/0344826 A1 | 10/2022 | Chowdhury et al. | |
| 2023/0022225 A1 | 1/2023 | Gunturu et al. | |
| 2023/0030324 A1 | 2/2023 | Ali et al. | |
| 2023/0043800 A1 | 2/2023 | Khojastepour et al. | |
| 2023/0047993 A1 | 2/2023 | Jian et al. | |
| 2023/0048721 A1 | 2/2023 | Gurelli | |
| 2023/0051630 A1 | 2/2023 | Gurelli | |
| 2023/0063645 A1 | 3/2023 | Gurelli et al. | |
| 2023/0176174 A1* | 6/2023 | Penna | G01S 5/02521 |
| | | | 342/451 |
| 2023/0180020 A1 | 6/2023 | Gurelli et al. | |
| 2023/0208479 A1 | 6/2023 | Wang et al. | |
| 2024/0305336 A1* | 9/2024 | Astrom et al. | H04B 7/04013 |

FOREIGN PATENT DOCUMENTS

| | | | |
|---|---|---|---|
| IN | 113225276 A | | 8/2021 |
| JP | 6559737 B2 | | 8/2019 |
| KR | 20200010151 A | | 1/2020 |
| WO | 2019045756 A1 | | 3/2019 |
| WO | 2021223863 A1 | | 11/2021 |
| WO | 2022063435 A1 | | 3/2022 |
| WO | 2022073618 A1 | | 4/2022 |

OTHER PUBLICATIONS

Tang W., et al., "Wireless Communications with Reconfigurable Intelligent Surface: Path Loss Modeling and Experimental Measurement", IEEE Transactions on Wireless Communications, arXiv:1911.05326v2 [eess.SP], Sep. 14, 2020, pp. 1-32, https://arxiv.org/pdf/1911.05326.pdf.

Wu Q., et al., "cdma2000 Highly Detectable Pilot", IEEE International Conference on Communications Workshops, 2008. ICC Workshops, IEEE, Piscataway, NJ, USA, May 19, 2008 (May 19, 2008), pp. 16-20, XP031265196, ISBN: 978-1-4244-2052-0, p. 1, Left-Hand Column, Line 8—p. 1, Right-Hand Column, Line 31, https://ieeexplore.ieee.org/abstract/document/4531856.

Wu Q., et al., "Intelligent Reflecting Surface Aided Wireless Communications: A Tutorial", IEEE Transactions on Communications, arXiv:2007.02759v2 [cs.IT], Jul. 7, 2020, pp. 1-74, https://arxiv.org/pdf/2007.02759v2.pdf.

Wu Q., et al., "Towards Smart and Reconfigurable Environment: Intelligent Reflecting Surface Aided Wireless Network", IEEE Communications Magazine, IEEE Service Center, Piscataway, US, vol. 58, No. 1, Jan. 1, 2020 (Jan. 1, 2020), XP011768215, pp. 106-112, ISSN: 0163-6804, DOI: 10.1109/MCOM.001.1900107 [retrieved on Jan. 24, 2020] abstract, pp. 106-110, figures 1, 2.

Zheng B., et al., "Intelligent Reflecting Surface-Enhanced OFDM: Channel Estimation and Reflection Optimization", IEEE Wireless Communications Letters, vol. 9, No. 4, Apr. 2020, pp. 1-5, arXiv:1909.03272v3 [cs.IT] [Jan. 29, 2020], https://arxiv.org/pdf/1909.03272.pdf.

* cited by examiner

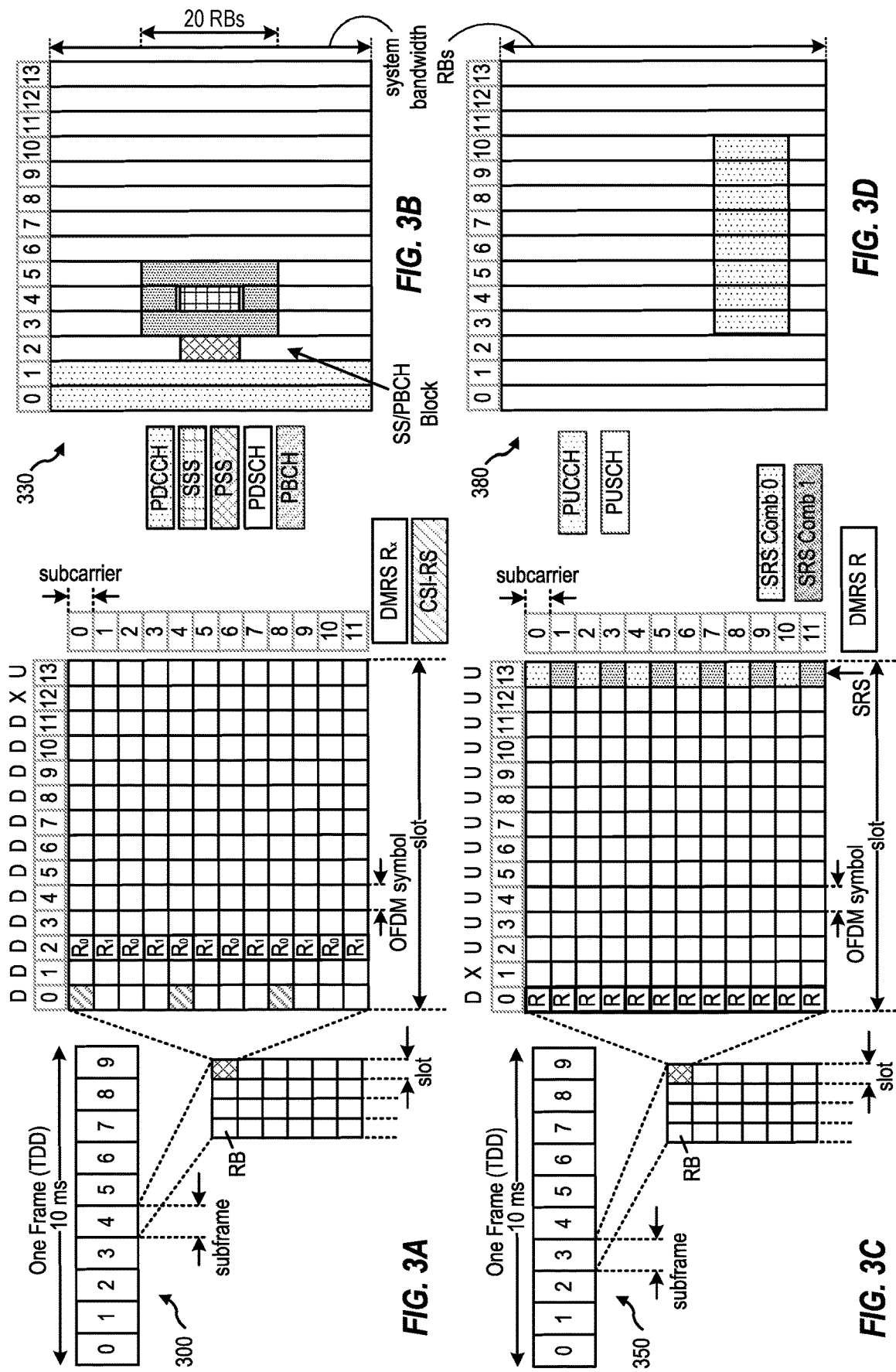

TECHNIQUES FOR INTELLIGENT REFLECTING SURFACE (IRS) POSITION DETERMINATION IN IRS AIDED POSITIONING

INTRODUCTION

Aspects of the present disclosure relate to wireless communications, and more particularly, to user equipment (UE) positioning using one or more intelligent reflecting surfaces (IRSs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE). The method generally includes setting a surface phase for each intelligent reflecting surface (IRS) of one or more IRSs based on a real focal point or a virtual focal point; for each IRS of the one or more IRSs: identifying a first IRS reflection center, measuring a first impulse response from the IRS using one or more first transmissions from a network entity that are reflected to the UE using the IRS, to obtain a first measured impulse response representation, wherein the first measured impulse response representation comprises a first histogram of measured delays for a plurality of rays through different points over a surface area of the IRS, determining a first impulse response for a first ray reflected from the first IRS reflection center of the IRS, estimating a first position of the UE based on, at least, the first IRS reflection centers for each of the one or more IRSs and the first impulse responses for each of the one or more IRSs, and estimating a second position of the UE in an iterative manner until one or more conditions are satisfied.

Another aspect provides a method for wireless communication by a UE. The method generally includes identifying first intelligent reflecting surface (IRS) reflection centers for one or more IRSs as a center of each of the one or more IRSs; estimating a first position of the UE based on, at least, the first IRS reflection centers for the one or more IRSs; and estimating a second position of the UE in an iterative manner until at least one of: a change in position of the UE based on the second position of the UE and a previously estimated position of the UE is less than a first threshold, or a change in location of each respective IRS reflection center for each of the one or more IRSs is less than a second threshold, wherein estimating the second position of the UE in the iterative manner comprises: identifying second IRS reflection centers for the one or more IRSs using the previously estimated position of the UE and a virtual focal point for each of the one or more IRSs; and estimating the second position of the UE based on, at least, the second IRS reflection centers for the one or more IRSs.

Another aspect provides a method for wireless communication by a UE. The method generally includes for each IRS of one or more IRSs focused on top of an estimated position of the UE and from which the UE receives reflected signals: computing a first expected impulse response, using the estimated position of the UE, to obtain a first expected impulse response representation, wherein the first expected impulse response representation comprises a first histogram of expected delays for a plurality of rays through different points over a surface area of the IRS; determining, using the first expected impulse response representation, a first impulse response for a first ray of the plurality of rays reflected from a first point of the different points over the surface area of the IRS; measuring a first impulse response from the IRS using one or more first transmissions from a network entity that are reflected to the UE using the IRS, to obtain a first measured impulse response representation, wherein the first measured impulse response representation comprises a first histogram of measured delays for the plurality of rays through the different points over the surface area of the IRS; aligning the first measured impulse response representation with the first expected impulse response representation by matching the first impulse response of the first expected impulse response representation to a second impulse response of the first measured impulse response representation; and determining a second point of the different points over the surface area of the IRS corresponding to the second impulse response of the first measured impulse response representation; estimating a first position of the UE based on, at least, the second point on the IRS for each of the one or more IRSs; determining a change in position of the UE based on the first position of the UE and the estimated position of the UE is greater than a threshold; and estimating a second position of the UE in an iterative manner until the change in position of the UE based on the second position of the UE and a previously estimated position of the UE is less than the threshold.

Another aspect provides a method for wireless communication by a UE. The method generally includes identifying first IRS reflection centers for one or more IRSs as a center of each of the one or more IRSs; measuring an initial impulse response from each of the one or more IRSs, to obtain an initial impulse response representation for each of the one or more IRSs; estimating a first position of the UE based on, at least: the first IRS reflection centers for the one or more IRSs and a peak point on the initial impulse response representation for each of the one or more IRSs; and estimating a second position of the UE in an iterative manner until a change in position of the UE based on the second position of the UE and a previously estimated position of the UE is less than a threshold, wherein estimating the second position of the UE in the iterative manner comprises: identifying second IRS reflection centers for the one or more IRSs using a previously estimated position of the UE and a focal point for each of the one or more IRSs;

for each IRS of the one or more IRSs: computing an expected impulse response, using the previously estimated position of the UE, to obtain an expected impulse response representation, wherein the expected impulse response representation comprises a histogram of expected delays for a plurality of rays through different points over a surface area of the IRS; determining, using the expected impulse response representation, a first impulse response for a first ray of the plurality of rays reflected from a first point of the different points over the surface area of the IRS; measuring a measured impulse response from the IRS using one or more transmissions from a network entity that are reflected to the UE using the IRS, to obtain a measured impulse response, wherein the measured impulse response representation comprises a histogram of measured delays for the plurality of rays through the different points over the surface area of the IRS; aligning the measured impulse response representation with the expected impulse response representation by matching the first impulse response of the expected impulse response representation to a second impulse response of the measured impulse response representation; and determining a second point of the different points over the surface area of the IRS corresponding to the second impulse response of the measured impulse response representation; estimating the second position of the UE based on, at least, the second point on the IRS for each of the one or more IRSs and the second impulse response for each of the one or more IRSs.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Aspects of the present disclosure provide apparatuses, methods, processing systems, and computer-readable mediums for more precise user equipment (UE) position estimation in intelligent reflecting surface (IRS) aided positioning. More specifically, aspects of the present disclosure provide techniques for precisely determining a single point in space (e.g., the IRS reflection center) used to represent the area occupied by an intelligent reflecting surface (IRS) for estimating the UE's position and time difference of arrival (TDOA) measurements. The IRS reflection center may represent the location on the IRS where a signal measured by a UE, for positioning, is projecting from.

In particular, equations used for positioning may require precise knowledge of the signal sources to accurately estimate the position of the UE. However, given the large surface area of an IRS, it may be challenging to determine the specific location of the IRS reflection center (e.g., the signal source/transmitter location on the IRS) for precisely determining the position of the UE. Further, in some cases, it may be unclear what measured delay corresponds to the determined IRS reflection center when the large surface of the IRS results in a wide delay-spread of a measured impulse response (e.g., when beam squint occurs).

Accordingly, aspects of the present disclosure provide techniques for precisely determining the IRS position used to represent the area occupied by an IRS to improve the accuracy of estimating a UE's position using, at least, the IRS. Further, in certain aspects, techniques are provided for precisely determining the impulse response corresponding to the delay of a ray that passes through the determined IRS position to the UE. Iterative methods described herein may be used to increase precision estimation for three different cases: a focused case, a defocused case, and a general case.

Introduction to Wireless Communication Networks

Figure 1:
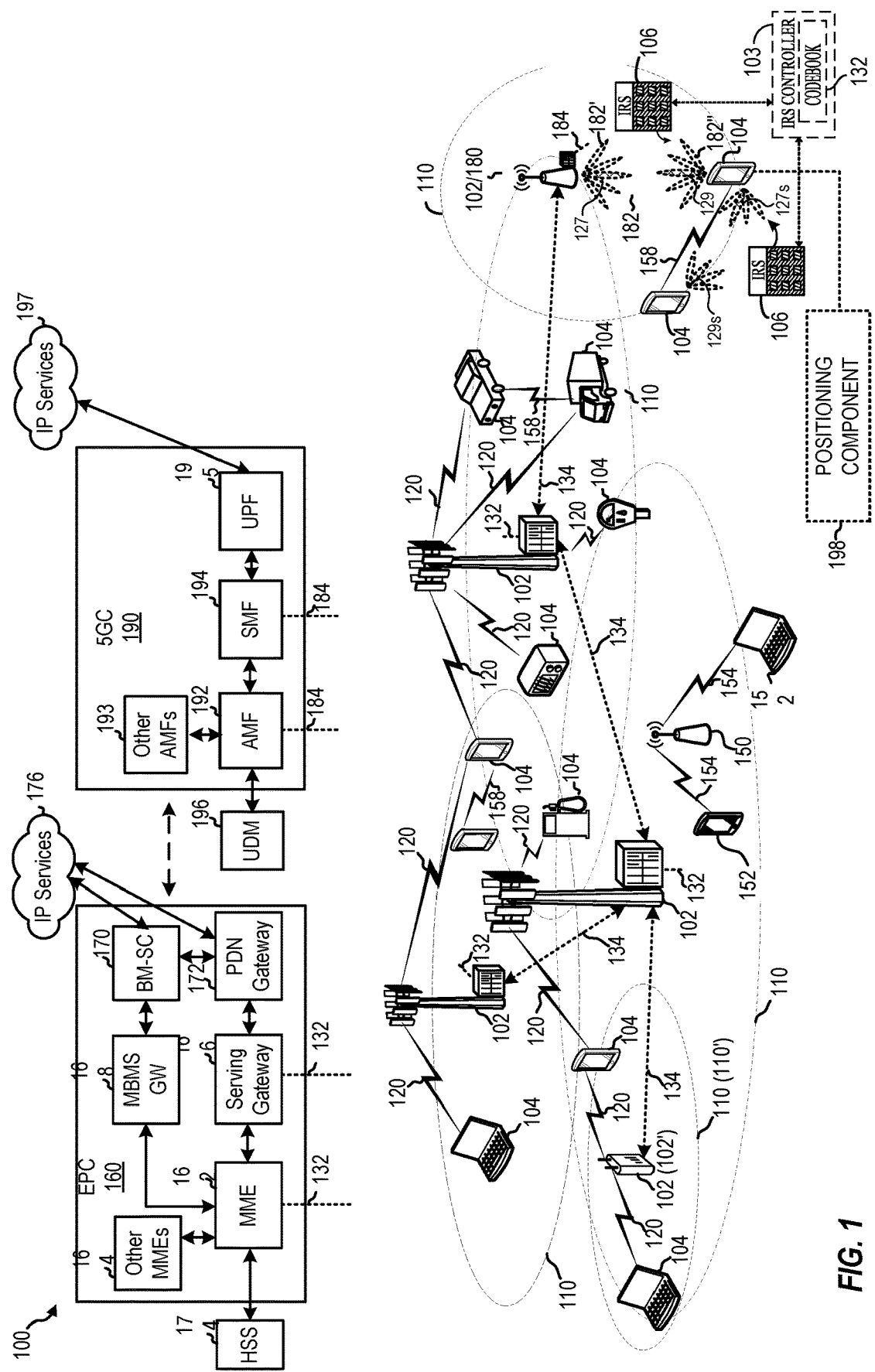
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A BS, such as BS 102, may include components that are located at a single physical location or components located at various physical locations. In examples in which BS 102 includes components that are located at various physical locations, the various components may each perform various functions such that, collectively, the various components achieve functionality that is similar to a base station that is located at a single physical location. As such, a BS 102 may equivalently refer to a standalone BS or a BS including components that are located at various physical locations or virtualized locations. In some implementations, a BS 102 including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

In certain aspects, communication between a BS 102 (e.g., next generation NodeB (gNB or gNodeB)) and a UE 104 may be blocked by obstacles (e.g., buildings, etc.) and require assistance from an intelligent reflecting surface (IRS) 106 (also referred to as a "reconfigurable intelligent surface", a "reflecting intelligent surface", a "reconfigurable impedance surface", an "intelligent reflection surface", or an "intelligent reconfigurable surface"). IRS 106 enables communications between BS 102 and UE 104 to be received and re-radiated, thereby avoiding the obstacles. For example, IRS 106 may be configured with a codebook for precoding one or more elements thereon (referred to as IRS elements) to allow a beam from one of BS 102 or UE 104 (e.g., a transmitter) to be re-radiated off the IRS to reach the other one of BS 102 or UE 104 (e.g., a receiver). The direction of the re-radiation by IRS 106 may be controlled or reconfigured by IRS controller 103 of the IRS 106.

IRS controller 103 includes a codebook 132 for applying a beamformer (e.g., precoding weights) according to IRS elements of IRS 106. Codebook 132 includes values of weights to configure each IRS element (or each group of IRS elements) to modify the radio signal re-radiated by each IRS element, such as weight shifting or changing amplitudes.

In an example, when UE 104 is the transmitter and communicates with BS 102 (e.g., over a wireless Uu interface), BS 102 is the receiver that provides IRS controller 103 feedback for selecting beamformer values for the IRS elements. Similarly, when UE 104 establishes a sidelink (e.g., PC5 interface) with another UE 104, UE 104 may be the transmitter and the other UE 104 may be the receiver that provides IRS controller 103 feedback. Codebook 132 may be generated based on specific settings of BS 102 and UE 104, and based on different parameters specific to different situations. The feedback from the receiver to IRS controller 103 allows for the selection of beamformer values for reflecting communications between the transmitter and the receiver. Other configurations in wireless communication network 100 can be similarly setup between UEs 104 and BSs 102.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

In certain aspects, wireless communication network 100 further includes positioning component 198, which may be configured to estimate a position of the UE using signals reflected from one or more IRSs.

Figure 2:
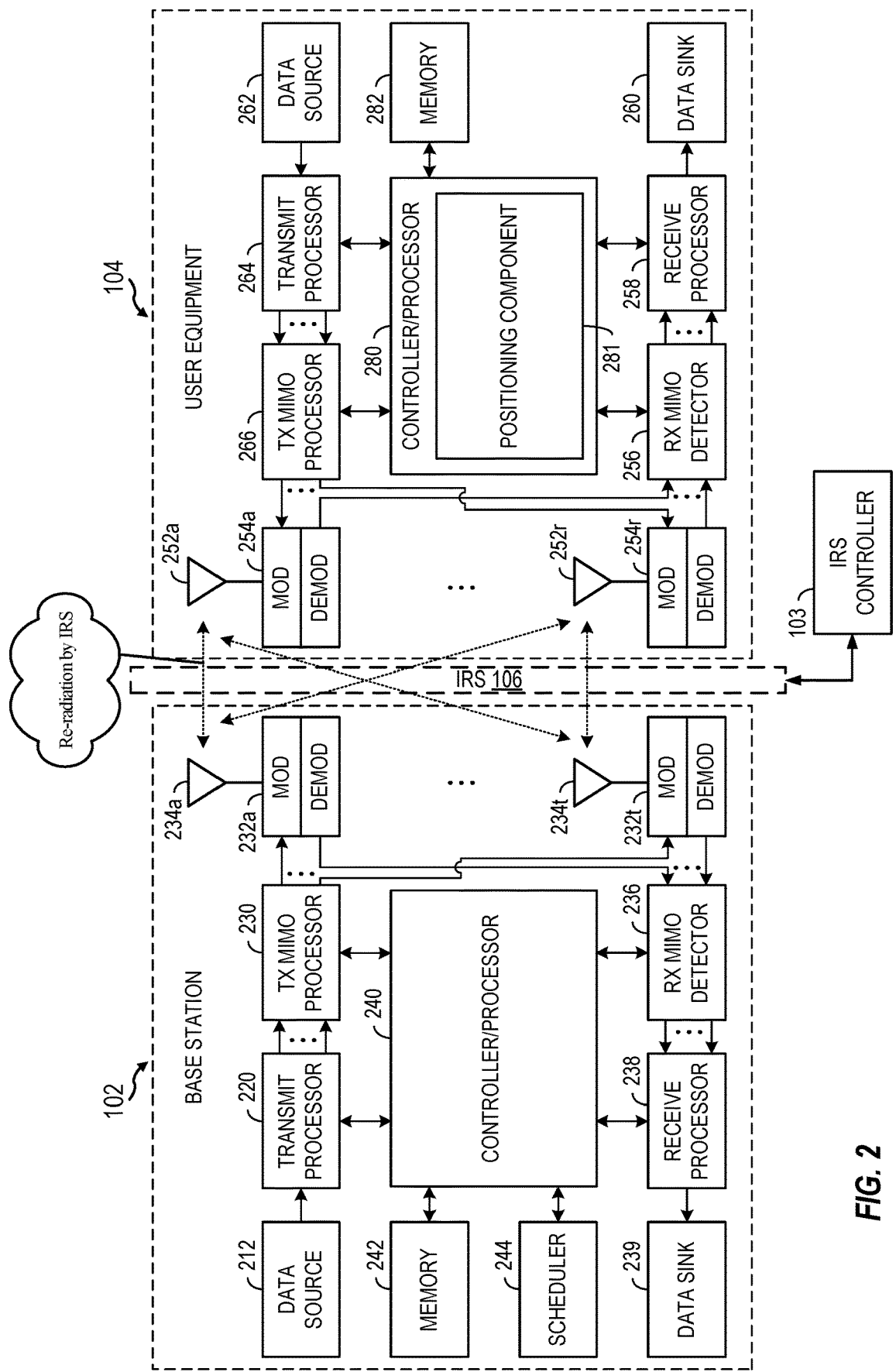
FIG. 2 is a block diagram conceptually illustrating aspects of an example of a base station (BS) and user equipment (UE).

FIG. 2 depicts aspects of an example BS 102 and a UE 104. As shown, IRS 106 may assist the communications, by receiving and re-radiating radio signals, between BS 102 and UE 104, such as when such communications are impeded or blocked by obstacles (not shown, illustrated as the blockage in FIGS. 4A and 4B). For example, IRS 106 may re-radiate the transmissions from one of BS 102 or UE 104 to the other using reflection, refraction, or other passive or active mechanisms.

IRS 106 may be reconfigured or controlled by an IRS controller 103. Each IRS element may re-radiate radio signals with certain phase or amplitude changes, such as phase shifts. IRS controller 103 may reconfigure the phase or amplitude changes by applying a beamformer weight to each IRS element or a group of IRS elements to enable IRS 103 to re-radiate an output beam at different directions given a particular input beam. An illustrative deployment example of IRS 103 is shown in FIG. 4B.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein. Although the present disclosure uses IRS(s) as example(s) of implementing the beamformer techniques, the techniques may apply to another form of cooperative communications, such as transparent relaying or regenerative relaying implementations.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications.

Generally. UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes positioning component 281, which may be representative of positioning component 198 of FIG. 1. Notably, while depicted as an aspect of controller/processor 280, positioning component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Millimeter Wave (mmWave) Wireless Communications

5G New Radio (NR) may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

One of the main drivers behind 5G is the availability of massive amounts of spectrum. In particular, the electromagnetic spectrum is often subdivided into various classes, bands, channels, or other features. The subdivision is often provided based on wavelength and frequency, where frequency may also be referred to as a carrier, a subcarrier, a frequency channel, a tone, or a subband. 5G networks may utilize several frequency ranges, which in some cases are defined by a standard, such as the 3GPP standards. For example, 3GPP technical standard (TS) 38.101 currently defines Frequency Range 1 (FR1) as including 600 megahertz (MHz)-6 gigahertz (GHz), though specific uplink (UL) and downlink (DL) allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific UL and DL allocations may fall outside of this general range. FR2, is sometimes referred to (interchangeably) as a "millimeter wave" ("mmW" or "mmWave") band, despite being different from the extremely high frequency (EHF) band (30 GHZ-300 GHz) that is identified by the International Telecommunications Union (ITU) as a "millimeter wave" band because wavelengths at these frequencies are between 1 millimeter (mm) and 10 millimeters.

Communications using mmWave/near mm Wave radio frequency band (e.g., 3 GHz-300 GHz) may have higher path loss and a shorter range compared to lower frequency communications. Accordingly, as described above with respect to FIG. 1, a BS (e.g., 180) configured to communicate using mmWave/near mmWave radio frequency bands may utilize beamforming (e.g., 182) with a UE (e.g., 104) to improve path loss and range.

Further, in some cases, to aid in seamless communication at mmWave bands, additional cell sites are added within existing infrastructure to increase the amount of available capacity, such additions may be referred to as network densification. Network densification. In particular, cell sites placed in capacity-strained areas add more capacity where it is most needed and also help to offload traffic from surrounding sites. Network densification may involve various layers of components including gNBs, remote-radioheads (RRHs), various types of repeaters, small-cells, and femto-cells. In some cases, network densification involves the addition of one or more intelligent reflecting surfaces (IRSs) to the existing infrastructure. IRS, as used herein, may also be referred to in the art as a reconfigurable intelligent surface, a reflecting intelligent surface, a reconfigurable impedance surface, an intelligent reflection surface, an intelligent reconfigurable surface, a fixed reflecting surface, a meta-surface, etc.

Example Application(s) of Intelligent Reflecting Surface(s) (IRS(s))

Massive multiple-input-multiple-output (MIMO) configuration increases throughput. For example, MIMO can achieve high beamforming gain by using active antenna units and can operate with individual radio frequency (RF) chains for each antenna port. To further such advantages and extend coverage, IRSs may be deployed to reflect impinging waves in desired directions. In some cases, IRSs may operate without substantial power consumption when they operate passively to only reflect or refract beams from a transmitter towards a receiver. In some cases, the reflection or refraction direction may be controlled by a network entity (e.g., base station (BS), next generation NodeB (gNB or gNodeB)) or a monitoring sidelink user equipment (UE).

Figure 4A:
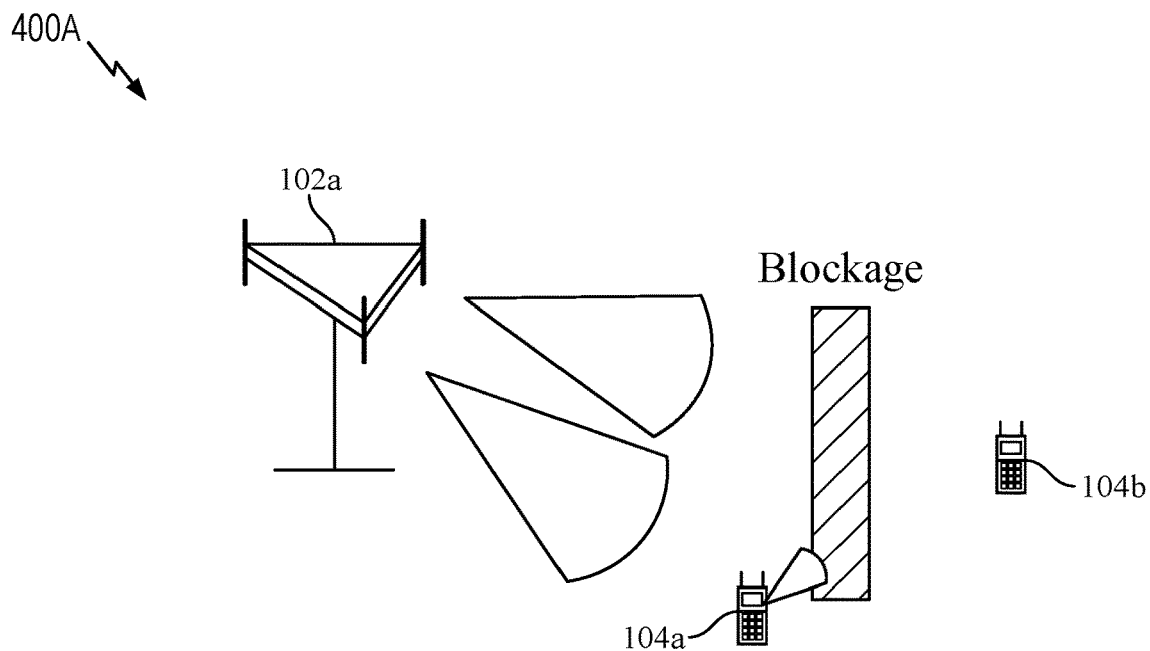
FIG. 4A illustrates an example of communication blockage between wireless communication devices, in accordance with certain aspects of the present disclosure.
Figure 4B:
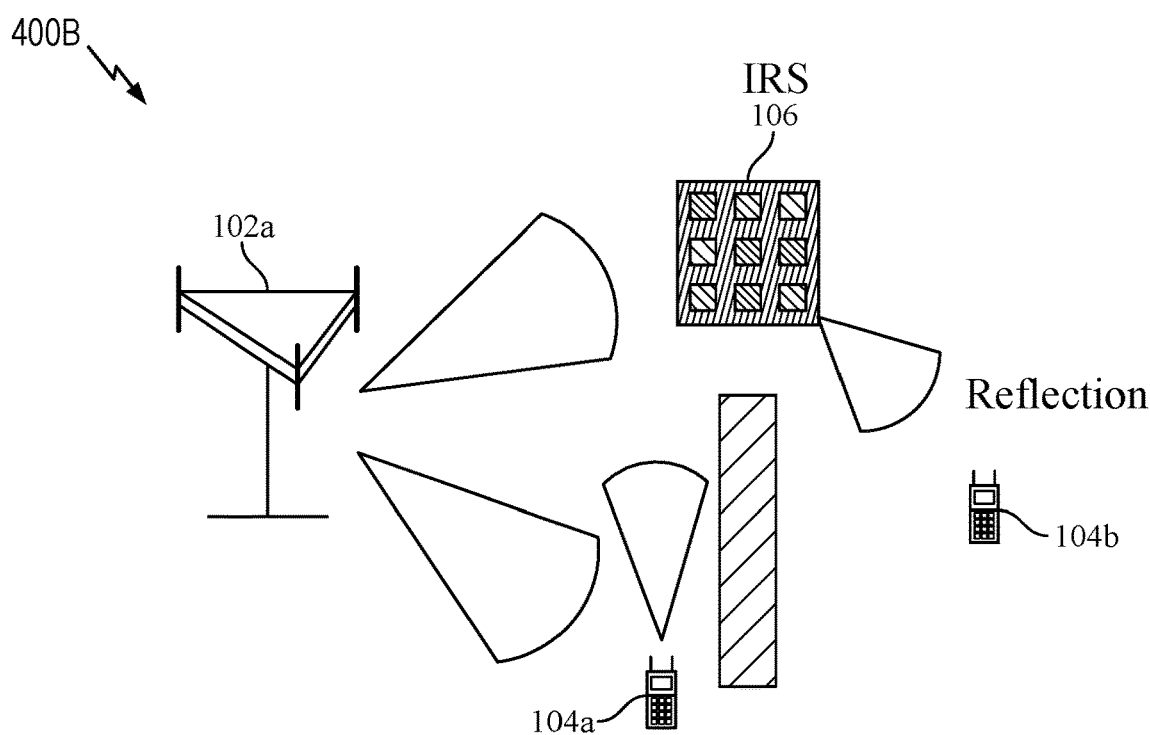
FIG. 4B illustrates an example of using an intelligent reflecting surface (IRS) to overcome impediment by obstacles between wireless communication devices, in accordance with certain aspects of the present disclosure.

FIG. 4A illustrates an example 400A of communication blockage between wireless communication devices, in accordance with certain aspects of the present disclosure. As shown, impeded by a blockage (e.g., blockages such as buildings, terrains, etc.), a network entity, BS 102a (e.g., BS 102 of wireless communication network 100 of FIG. 1), is only able to transmit to a first UE, UE 104a, as transmissions may not reach a second UE, UE 104b, given the blockage prevents signals from reaching UE 104b. The blockage also prevents UE 104b from establishing sidelink communications with UE 104a. As such, UE 104b is prevented from communicating with BS 102a via UE 104a, using sidelink.

FIG. 4B illustrates an example 400B of using IRS 106 to overcome the blockage, in accordance with certain aspects of the present disclosure. As shown, an IRS 106 is introduced to reflect, or otherwise re-radiate, radio signals to bypass the blockage. For example, two-way communications between BS 102a and UE 104b are enabled by IRS 106 re-radiating one or more beams from BS 102a toward UE 104b, and vice versa. Furthermore, in some cases, IRS 106 is reconfigured, such as with different beamformer values, to enable UEs 104a and 104b to establish sidelink communications.

Figure 5:
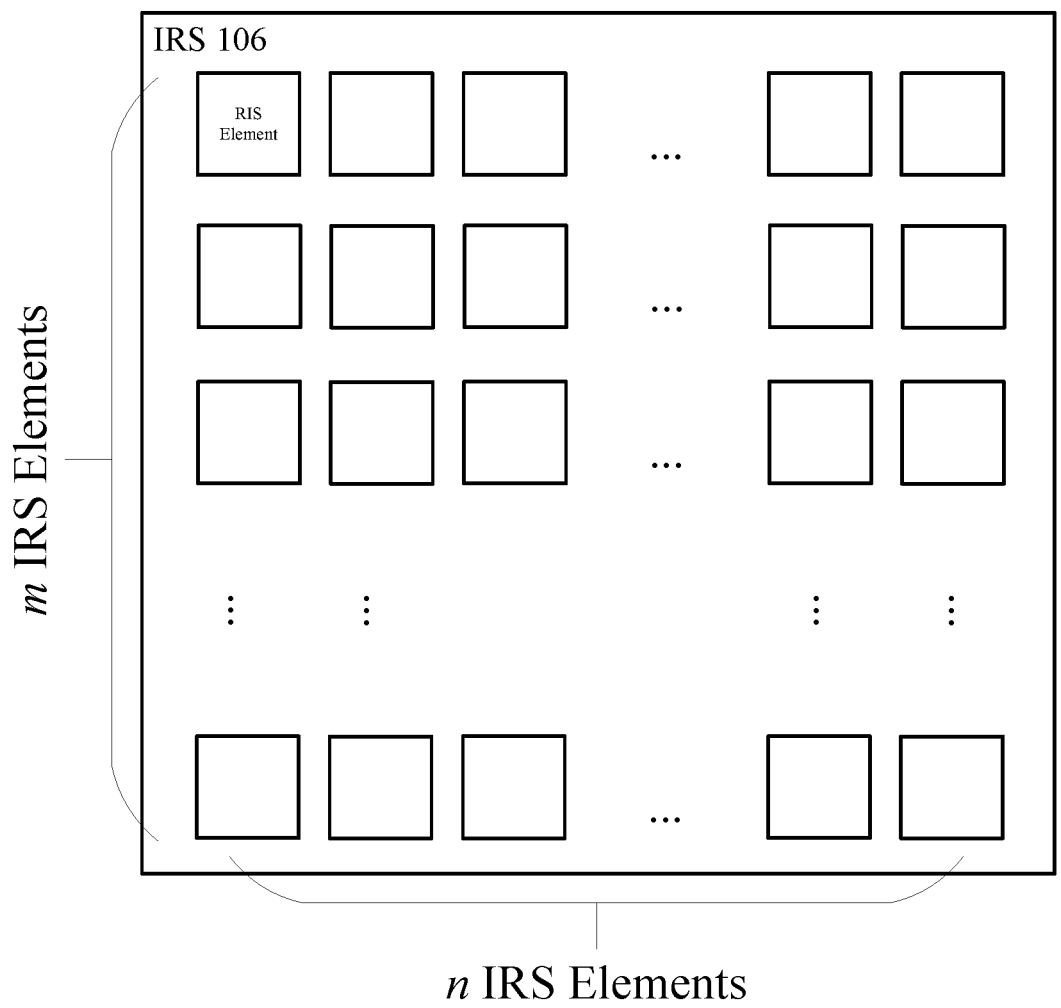
FIG. 5 illustrates an example arrangement of IRS elements, in accordance with certain aspects of the present disclosure.

FIG. 5 illustrates an example arrangement 500 of IRS elements (e.g., such as elements of IRS 106 in FIGS. 1, 2, and 4B), in accordance with certain aspects of the present disclosure. As illustrated in FIG. 5, the surface of IRS 106 consists of any array of discrete elements, such as an m×n rectangular matrix of discrete elements, that can be controlled individually or on a group level. Such elements may enable IRS 106 to perform passive beamforming. For example, IRS 106 may receive signal power from a transmitter (e.g., BS 102, UE 104a, or UE 104b) proportional to the number of IRS elements thereon. When IRS 106 reflects or refracts the radio signal, elements of IRS 106 cause phase shifts to perform conventional beamforming or beamformer. The phase shifts are controlled by beamformer weights (e.g., a multiplier or an offset of time delay) applied to the elements of IRS 106. In some cases, for the array of IRS elements illustrated in FIG. 5, for example, a respective beamformer weight may be generated or specified for each of the IRS elements by the IRS controller.

Example Intelligent Reflecting Surface (IRS) Aided Positioning

In general, intelligent reflecting surfaces (IRSs) enhance the coverage and capacity of wireless communication systems with low hardware cost and energy consumption. Moreover, IRSs provide additional benefits in several applications, such as for example, with respect to positioning. Because an increasing awareness of objects about their own location is an essential feature of emerging systems and services in wireless communication, e.g., autonomous systems and industrial Internet of Things (IoT), positioning is seen as an integral part of the system design of 5G mobile radio networks.

For example, IRS-based positioning methods provide an alternative to traditional positioning methods (e.g., GPS, terrestrial positioning systems, etc.) which may use transmitters positioned at several geographically separated locations. Instead of using multiple transmitters, IRS-based positioning methods may use as few as one transmitter whose signal is reflected from numerous IRSs for positioning techniques, in addition to one or more mathematical equations, to determine a UE's position.

Such mathematical equations used to determine the UE's position, however, may require precise knowledge of the signal sources, in this case, the IRS reflection center(s). The "IRS reflection center" essentially refers to a single point in space, which may vary based on UE position, used to represent the area occupied by the IRS. The IRS reflection center may represent a point on the surface area of the IRS where a signal measured by a UE (e.g., for positioning) is coming from. In other words, the IRS reflection center may be considered as the transmitter location, e.g., the location where the signal/energy is projecting from on the IRS, for positioning purposes.

Figure 6:
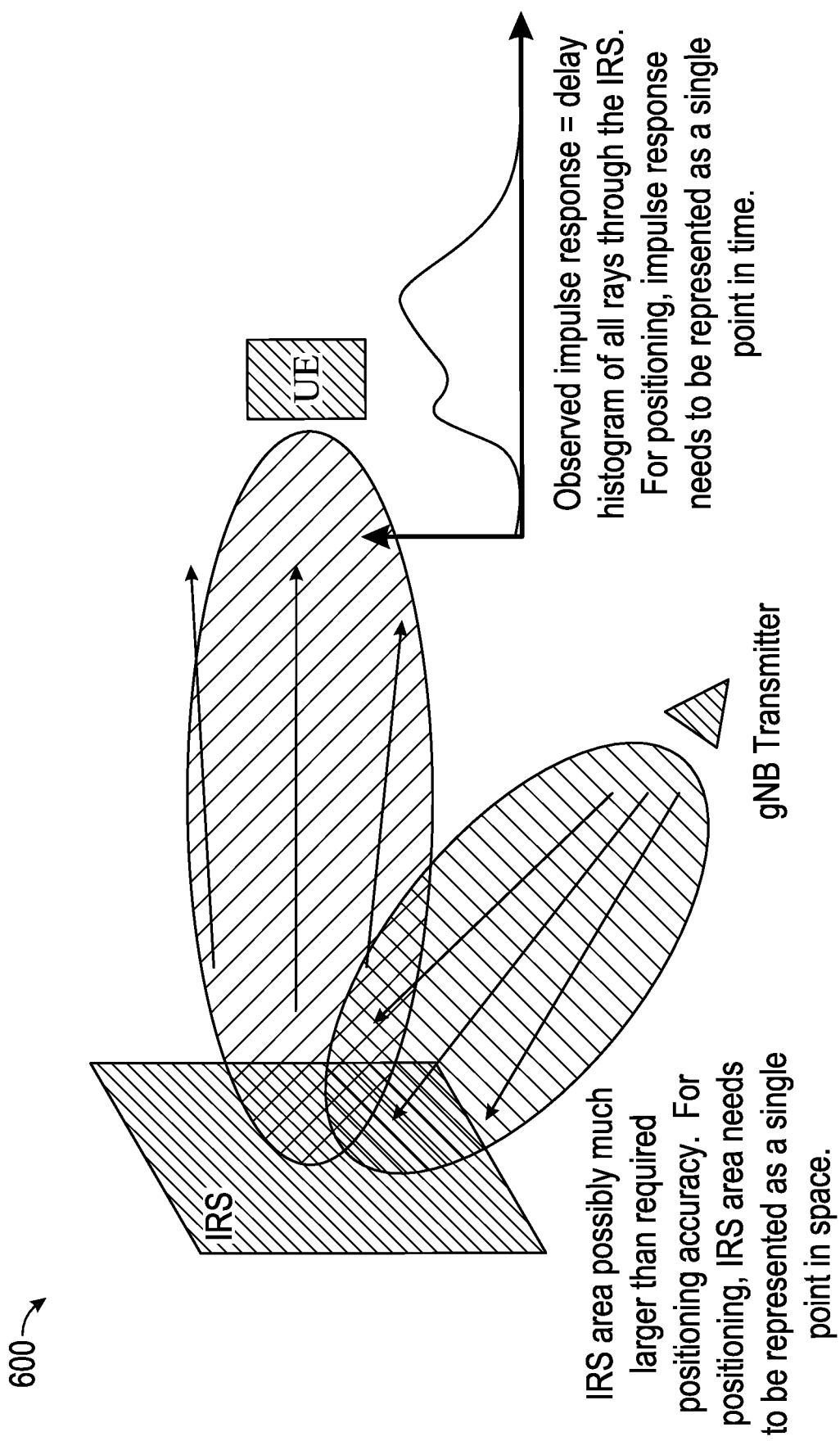
FIG. 6 illustrates example UE positioning using an IRS, in accordance with certain aspects of the present disclosure.

FIG. 6 is a diagram 600 illustrating example UE positioning using an IRS, in accordance with certain aspects of the present disclosure. Given the typically large surface area of an IRS (as illustrated by FIG. 6), determining the specific location of the IRS reflection center (e.g., the transmitter location on the IRS) for precisely determining the position of a UE may be challenging. For example, where a maximum of 10 cm of positioning error is allowed, and the IRS is 1 meter in size, depending upon the point on the IRS considered as the IRS reflection center, the estimated position of the UE may fall outside the allowed positioning error.

Further, in some cases, the large surface of the IRS may result in a wide delay-spread of a measured impulse response. For example, as shown in FIG. 6, the measured impulse response (also referred to as the "observed impulse response") by a UE may be represented as a histogram of measured delays for a plurality of rays through different points over the surface area of the IRS. In cases where beam squint occurs, the measured impulse response may look similar to the time-domain view of the measured impulse response illustrated in FIG. 6 where a blur effect in the frequency domain occurs and causes drooping at the band edges.

Figures 7A, 7B:
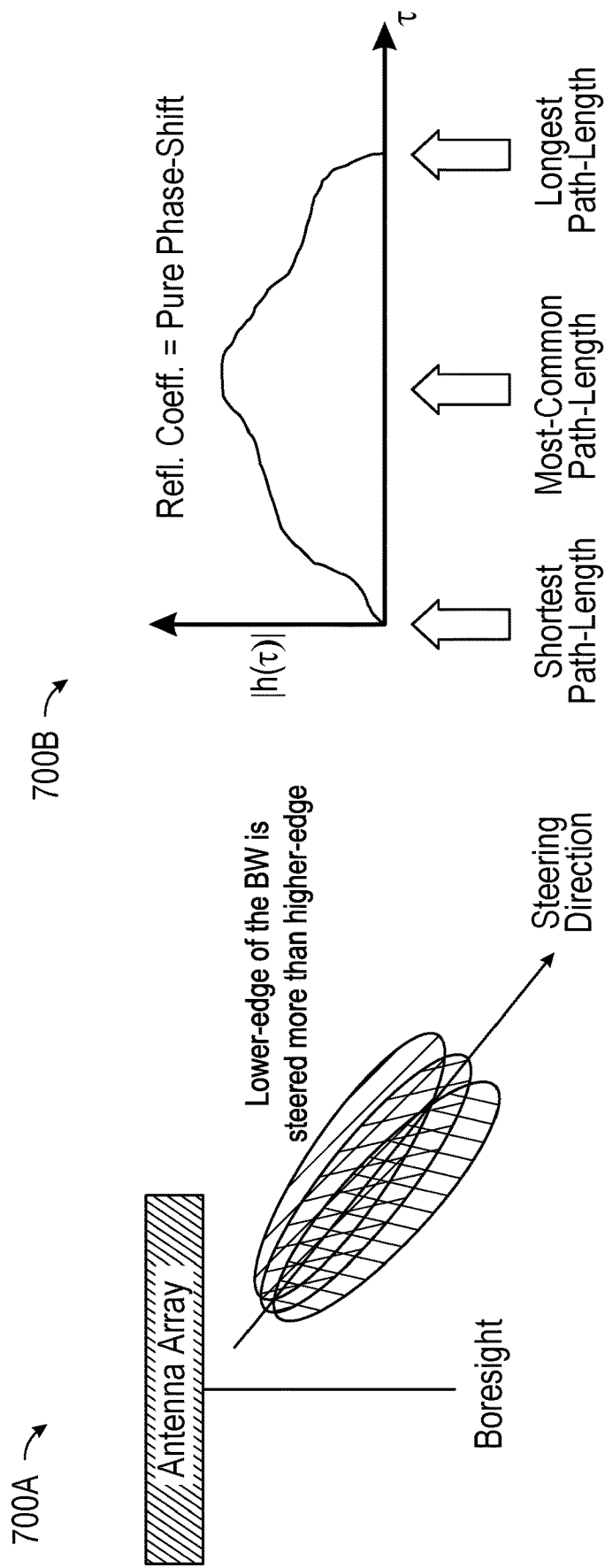
FIGS. 7A and 7B illustrate example beam squint, in accordance with certain aspects of the present disclosure.

As used in the art, beam squint may refer to the phenomenon where different frequency components in a signal transmitted by a phased array are beamformed in different direction due to the "phase" at each antenna element corresponding to a different actual path length depending on the frequency. For example, if a wavelength is 10 cm, a 90° phase may correspond to a 2.5 cm path length; however, where the wavelength is increased, the same phase may correspond to a longer path length. FIG. 7A illustrates example beam squinting, in accordance with certain aspects of the present disclosure. Although beam squint typically applies to antenna arrays, beam squint may also apply to IRSs.

FIG. 7B illustrates the time-domain view of beam squint for an IRS. In particular, FIG. 7B illustrates the impulse response for a plurality of rays reflected from different points over the surface area of the IRS. As shown in FIG. 7B, the impulse response is almost-continuous time, and may be represented by the following equation:

$$h(\tau) = \text{histogram}(\{\tau_n : gNB\text{-}UE \text{ delay thru } n\text{'th metaatom}\}) \times e^{j2\pi f_c \tau}$$

For positioning purposes, however, the impulse response may need to be represented as a single point on the histogram, which corresponds to the determined IRS reflection center. In some cases, it may be difficult to precisely determine the impulse response corresponding to the delay of a ray that passes through the IRS reflection center for precisely determining the position of the UE.

Accordingly, techniques for precisely determining the IRS reflection center, as well the impulse response corresponding to the delay of a ray that passes through the IRS reflection center, may be desired to improve the precision of UE positioning using one or more IRSs.

Aspects Related to Techniques for Intelligent Reflecting Surface (IRS) Position Determination in IRS Aided Positioning Aspects of the present disclosure provide techniques for precisely determining a single point in space (e.g., the intelligent reflecting surface (IRS) reflection center) used to represent the area occupied by an IRS to improve the accuracy of estimating a user equipment's (UE's) position using, at least, the IRS. Further, in certain aspects, techniques are provided for precisely determining the impulse response corresponding to the delay of a ray that passes through the determined IRS reflection center to the UE. Iterative methods described herein may be used to precisely determine the IRS reflection center, and in some cases, the impulse response for the IRS reflection center, for three different cases: a focused case, a defocused case, and a general case.

Figure 8A:
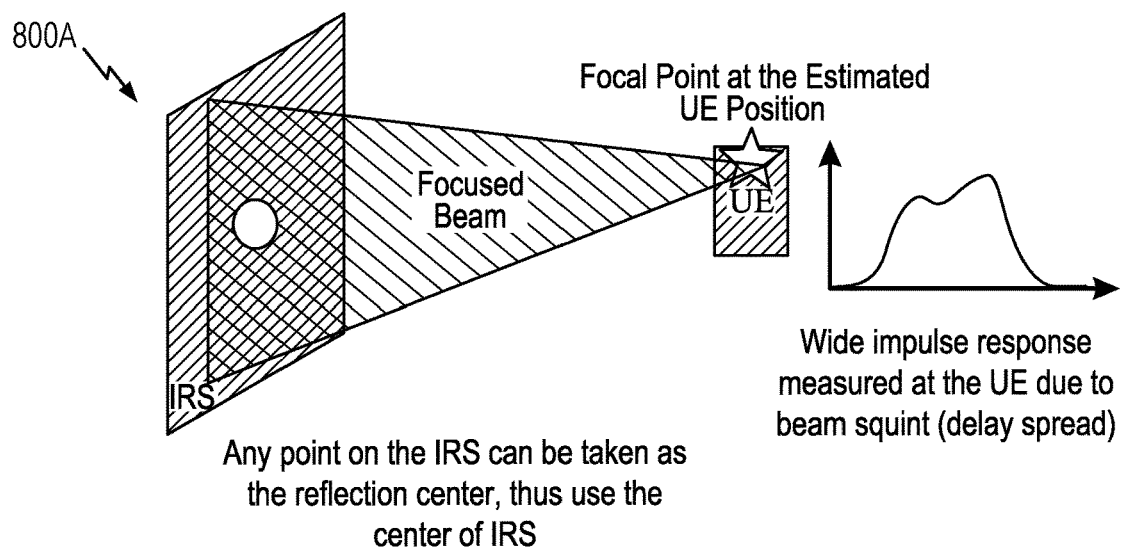
FIGS. 8A, 8B, and 8C illustrate an example focused case, an example defocused case, and an example general case, respectively for IRS aided positioning, in accordance with certain aspects of the present disclosure.

FIG. 8A illustrates an example focused case 800A for IRS aided positioning, in accordance with certain aspects of the present disclosure. The focused case may refer to a scenario where wireless signals, transmitted by a network entity and reflected from one or more IRSs, are focused towards a receiver device (e.g., a UE). As used herein, a network entity may refer to a wireless communication device in a radio access network (RAN), such as a BS, a remote radio head or antenna panel in communication with a BS, and/or a network controller, for example. In particular, the focusing operation may be used by an IRS for beamforming towards a UE (e.g., where the location of the UE is known), such that the wireless signals (e.g., rays) are focused towards the specific UE, rather than having the signals spread in all directions from a broadcast antenna. Focusing may be achieved by setting the surface phase of an IRS in a particular way to cause energy to be focused on the UE. As illustrated in FIG. 8A, given all signals reflected from the IRS are expected to reach the UE, any point on the IRS may be used as the IRS reflection center for positioning purposes. However, the focused case may suffer from beam squint; thus, the measured impulse response may have a wide delay spread, also as illustrated in FIG. 8A. Accordingly, for the focused case, aspects herein describe using iterative methods to precisely determine the impulse response corresponding to the delay of a ray that passes through the determined IRS reflection center.

Figure 8B:
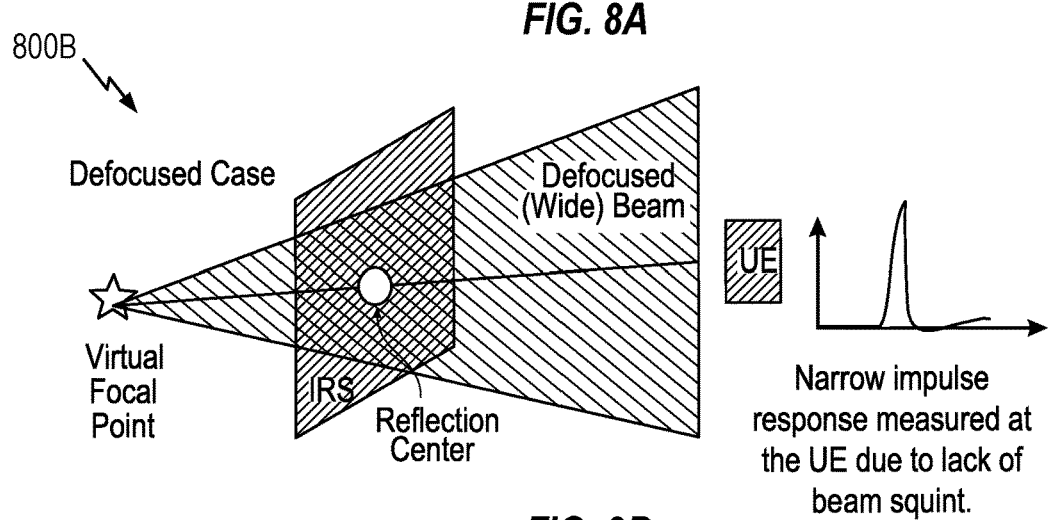

FIG. 8B illustrates an example defocused case 800B for IRS aided positioning, in accordance with certain aspects of the present disclosure. The defocused case may refer to a scenario where wireless signals, transmitted by a network entity and reflected from one or more IRSs, are not focused towards a receiver device (e.g., a UE). Instead, as illustrated in FIG. 8B, the surface phase of an IRS may be set such that waves appear as if they are propagating/radiating from a virtual focal point defined to be a point at any location behind the IRS. While the focusing case is concerned with waves converging on the UE, in the defocusing case, such waves may diverge and form a wide beam. Wide beams may be better for broadcasting data on a given frequency across a wider area, as compared to spot beams which are more concentrated in power. Accordingly, wide beams may be useful in positioning where a UE's location is unknown (e.g., unlike the focusing case). Further, wide beams may suffer from little, or no, effects of beam squint given energy arrives to a UE from a narrow region. Because there is no beam squint (e.g., delay spread), in the defocused case, as illustrated in FIG. 8B, the peak of the impulse response may be narrow, and thus used as the impulse response needed in determining the position of the UE. However, for the defocused case, aspects herein may use iterative methods to precisely determine the IRS reflection center.

Figure 8C:
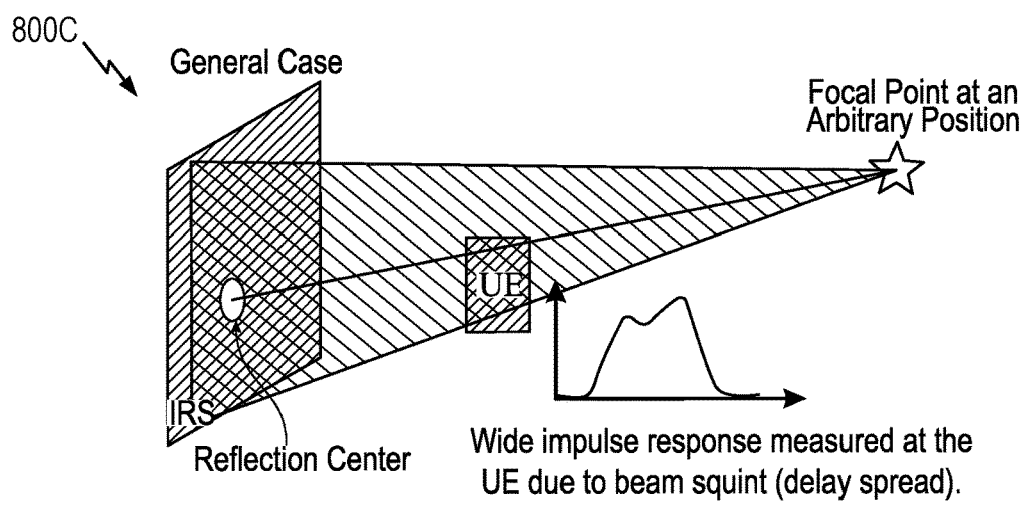

FIG. 8C illustrates an example general case 800C for IRS aided positioning, in accordance with certain aspects of the present disclosure. The general case may refer to a scenario where wireless signals, transmitted by a network entity and reflected from one or more IRSs, are focused at a focal point at any arbitrary location, other than the UE's location. In particular, the general case may apply to scenarios where wireless signals are focused at real focal points, as well as, scenarios where wireless signals are focused at infinity (e.g., reflected rays are parallel). Similar to the focused case, the general case may suffer from beam squint; thus, the measured impulse response may have a wide delay spread, as illustrated in FIG. 8C. Accordingly, for the general case, aspects herein describe using iterative methods to precisely determine the (1) IRS reflection center and the (2) impulse response corresponding to the delay of a ray that passes through the determined IRS reflection center.

Figure 9:
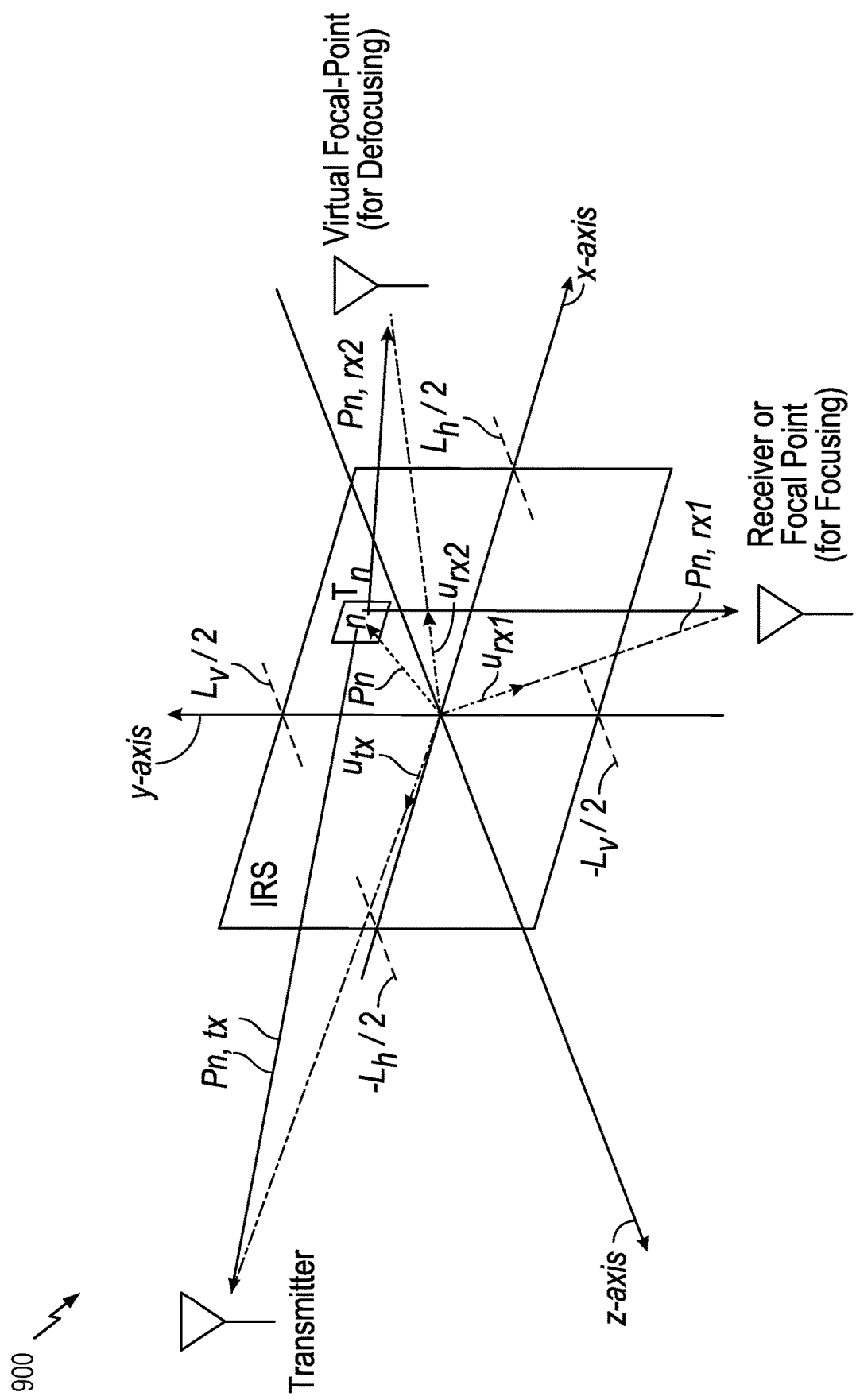
FIG. 9 is an example coordinate system illustrating vectors used to compute a reflection coefficient for focusing transmitter signals at a receiver, a real focal point, or a virtual focal point, in accordance with certain aspects of the present disclosure.

FIG. 9 is a coordinate system 900 illustrating example vectors used to compute a reflection coefficient for focusing transmitter signals at a receiver (e.g., at an estimated position of the UE for the focusing case), a real focal point (e.g., for the general case), or a virtual focal point (e.g., for the defocused case), in accordance with certain aspects of the present disclosure. The computed reflection coefficient may be used to set the surface phase for the IRS. In certain aspects, by properly setting the surface phase (e.g. the phases of surface elements), a network entity's beam (e.g., gNB's beam) may be reflected from the IRS, where the surface phase is set, towards a UE (in downlink (DL)).

As illustrated in FIG. 9, a reflection coefficient, $\Gamma_n$, at surface element "n" may be computed by the following equation:

$$\Gamma_n = \exp\left(\frac{j2\pi(d_{n,tx} + d_{n,rx})}{\lambda}\right)$$

where $d_{n,tx}=|p_{n,tx}|$, $p_{n,tx}$ is the vector from surface element "n" to the transmission (tx) point, $d_{n,rx}=|p_{n,rx}|$, $p_{n,rx}$ is the vector from surface element "n" to the receiver (rx) point, and $\lambda$ is the operating wavelength. $p_{n,rx}$ may depend on whether the transmitter signals are focused at a receiver (e.g., the UE), a real focal point, or a virtual focal point. Further, as shown in FIG. 9, $p_n$ is the vector from the origin to surface element "n", $\mu_{tx}$ is the unit-vector from the origin to the tx point, and $\mu_{rx}$ is the unit-vector from the origin to the rx point. $\mu_{rx}$ may depend on whether the transmitter signals are focused at a receiver (e.g., the UE), a real focal point, or a virtual focal point. The term virtual focal point is used to mean a point behind the IRS where electromagnetic propagation appears to originate from. In other words, the term is used to mean a virtual image of a transmitter.

Beginning with the defocused case, in certain aspects, iterative methods may be used to precisely determine IRS reflection centers for one or more IRSs (e.g., an IRS reflection center per IRS, where the IRS reflection center may be different for each IRS) to be used for estimating the position of a UE.

Figure 10:
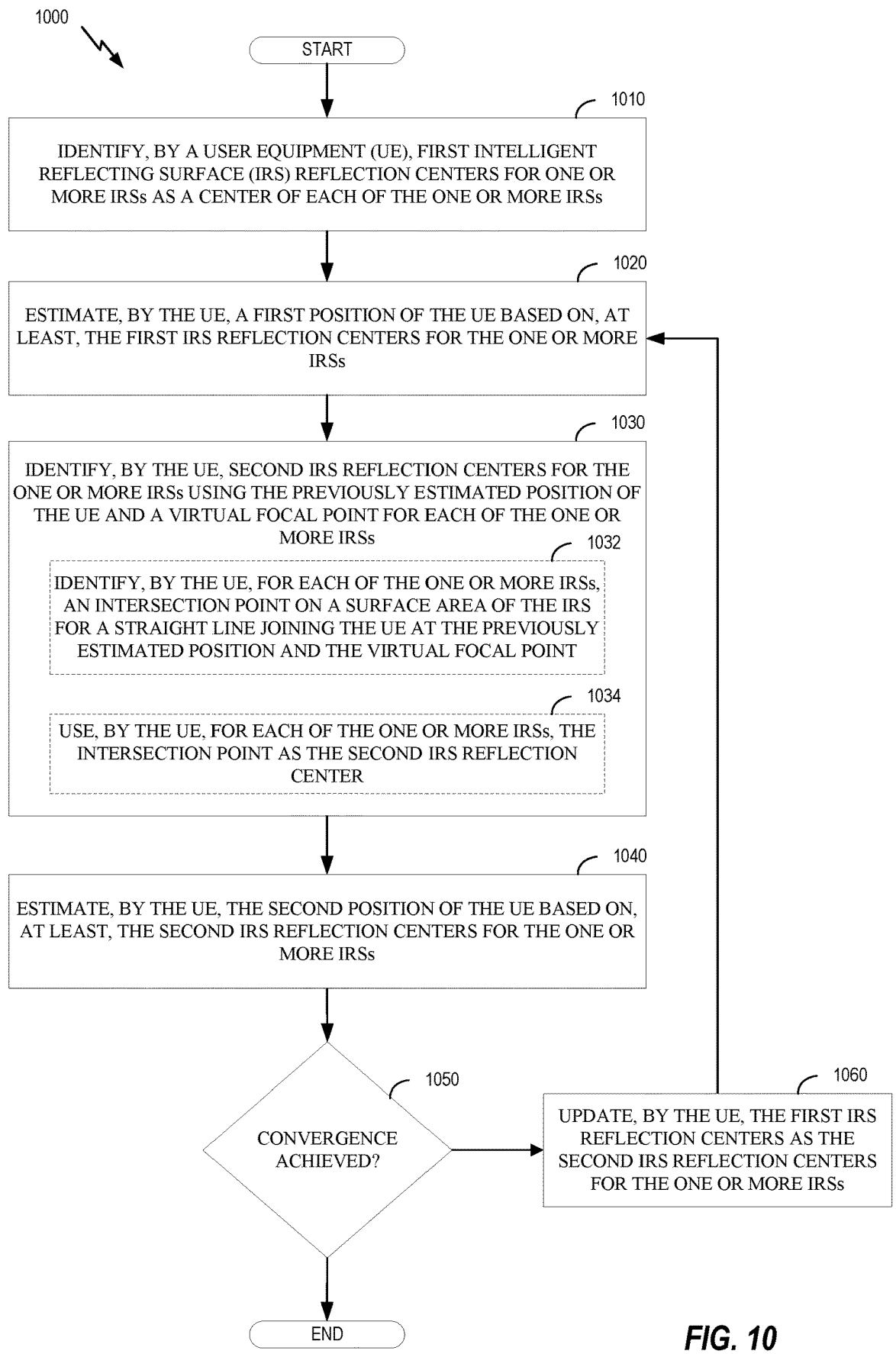
FIG. 10 is a workflow illustrating example operations for determining IRS reflection center(s) for UE positioning in a defocused case, in accordance with certain aspects of the present disclosure.

FIG. 10 is a workflow illustrating example operations 1000 for determining IRS reflection center(s) for UE positioning in a defocused case, in accordance with certain aspects of the present disclosure. In certain aspects, operations 1000 may be performed by a UE, for example, by UE 104 in wireless communication network 100.

Operations 1000 may be implemented as software components that are executed and run on one or more processors (e.g., controller/processor 280 of FIG. 2). Further, the transmission and reception of signals by the wireless node in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1000 may begin, at 1010, by the UE identifying first IRS reflection centers for one or more IRSs as a center of each of the one or more IRSs. For example, where four IRSs are being used for positioning, the UE may identify four IRS centers, e.g., one IRS center per IRS. The center of each IRS may be used as a starting point for determining the precise location of the IRS reflection center using iterative methods, as described in the following operations of FIG. 10.

At 1020, the UE estimates a first position of the UE based on, at least, the first IRS reflection centers for the one or more IRSs. In certain aspects, the UE estimates the first position of the UE using time difference of arrival (TDOA) measurements of different signals reflected from the one or more IRSs, the signals being transmitted by one or more network entities. Using the previous example, the UE may use the four centers of the four different IRSs and the TDOA measurements to calculate the first position of the UE. In calculating the first position of the UE, the UE may have knowledge of (1) a position of each of the one or more network entities transmitting signals reflected from each IRS to the UE and (2) a position, an orientation, and a size of each IRS.

In certain aspects, operations 1000 further include the UE measuring an impulse response to obtain an impulse response representation. The UE may use a peak point on the impulse response representation for the different signals reflected from the one or more IRSs for the TDOA measurements used to estimate the first position of the UE at 1020.

At 1030, the UE identifies second IRS reflection centers for the one or more IRSs using the previously estimated position of the UE and a virtual focal point for each of the one or more IRSs. The identified second IRS reflection centers may be different for each of the one or more IRSs. For example, using the previous example, the UE may identify four second IRS reflection centers, e.g., one second IRS reflection center per IRS.

Further, as mentioned previously, the virtual focal point for each IRS may be selected, and the UE may use the selected position for each IRS to set a surface phase for each of the IRSs. In certain aspects, the UE may also use positions of one or more network entities transmitting signals reflected from each IRS to the UE and a position, an orientation, and a size of each IRS to set the surface phase for each IRS. The surface phase may be set such that defocused beams are produced, in this case.

In certain aspects, the UE identifies the second IRS reflection centers for the one or more IRSs by, (1) at 1032, identifying an intersection point on a surface area of the IRS for a straight line joining the UE at the previously estimated position and the virtual focal point and, (2) at 1034, using the intersection point as the second IRS reflection center. For example, the UE may (1) produce an estimate of an intersection point on a first IRS, of the one or more IRSs, for a straight line between the previously estimated position of the UE (e.g., the first position of the UE) and a virtual focal point for the first IRS and (2) use this intersection point as the second IRS reflection center for the first IRS. Further, the UE may (1) produce an estimate of an intersection point on a second IRS, of the one or more IRSs, for a straight line between the previously estimated position of the UE (e.g., the first position of the UE) and a virtual focal point for the second IRS and (2) use this intersection point as the second IRS reflection center for the first IRS. The UE may perform such steps for each IRS until a second IRS reflection center is estimated for each of the IRSs. Identifying second IRS reflection centers for the one or more IRSs is described in more detail with respect to FIGS. 11A and 11B.

At 1040, the UE estimates the second position of the UE based on, at least, the second IRS reflection centers for the one or more IRSs (e.g., identified at 1030). In certain aspects, the UE estimates the second position of the UE using TDOA measurements of different signals reflected from the one or more IRSs, the signals being transmitted by one or more network entities. Using the previous example, the UE may use the four second IRS reflections centers identified for the four different IRSs and the TDOA measurements to calculate the second position of the UE. In calculating the second position of the UE, the UE may have knowledge of (1) a position of each of the one or more network entities transmitting signals reflected from each IRS to the UE and (2) a position, an orientation, and a size of each IRS.

At 1050, the UE determines whether convergence has been achieved. In certain aspects, convergence is achieved where a change in position of the UE, based on the second estimated position of the UE and a previously estimated position of the UE (e.g., the first estimated position of the UE), is less than a first threshold. The first threshold may be any number greater than zero, and in some cases, may be preconfigured.

In certain other aspects, convergence is achieved where a change in location of each respective IRS reflection center for each of the one or more IRSs is less than a second threshold. For example, using the previous example, convergence may be achieved when a change in the second estimated IRS reflection center for the first IRS (e.g., of the four IRSs) is less than a threshold, a change in the second estimated IRS reflection center for the second IRS is less than a threshold, a change in the second estimated IRS reflection center for the third IRS is less than a threshold, and a change in the second estimated IRS reflection center for the fourth IRS is less than a threshold.

The second threshold may be any number greater than zero, and in some cases, may be preconfigured. In certain aspects, the first threshold may be equal to the second threshold.

Accordingly, at 1050, the UE may make one or both of these determinations. Where, at 1050, convergence has been achieved, operations 1000 may be complete. In other words, the precise location of the IRS reflection center for each IRS of the one or more IRSs has been determined, and the UE position estimated using such IRS reflection centers may be used. According to aspects descried herein, the estimated UE position should provide an accurate estimate as to the UE's position, given, in some cases, multiple iterations are necessary to determine the IRS reflection center before both a precise IRS reflection center and estimated UE position can be used.

On the other hand, where at 1050, convergence has not been achieved, at operation 1060 the UE may update the first IRS reflection centers as the second IRS reflection centers for the one or more IRSs. Following such an update, operations 1020-1050 (and in some cases, 1060) may be repeated. In other words, IRS reflection centers and UE positions may be iteratively determined until convergence is achieved. For example, in some cases, the number of iterations of operations 1000 may be minimal where the initial estimate of the IRS reflection center for each IRS was close to the precise location of the IRS reflection, thereby allowing convergence to be achieved earlier. However, in some cases, multiple iterations of operations of 1000 may be necessary to precisely determine the IRS reflection center for each IRS (e.g., to precisely determine the UE's position), and accordingly achieve convergence. According to aspects descried herein, the estimated UE position should provide an accurate estimate as to the UE's position, given, in some cases, multiple iterations are necessary to determine the IRS reflection center before both a precise IRS reflection center and estimated UE position can be used.

Figure 11A:
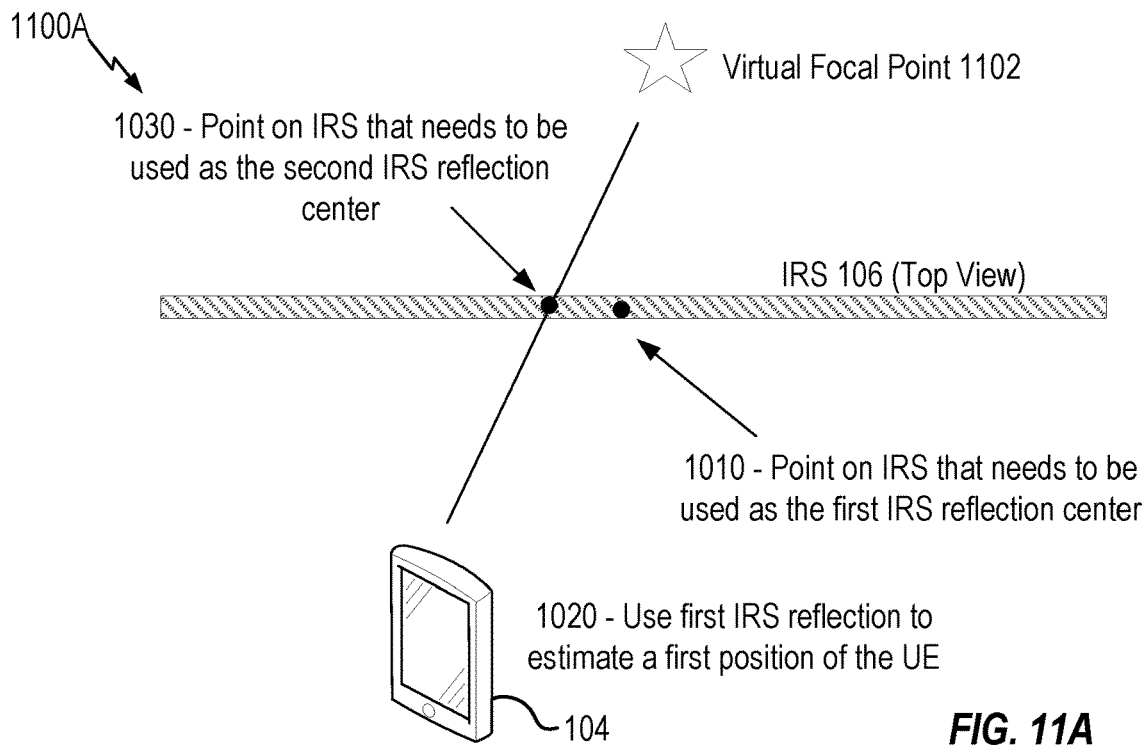
FIGS. 11A and 11B provide an example illustrating iterative techniques for determining a precise IRS reflection center for an IRS, in accordance with certain aspects of the present disclosure.
Figure 11B:
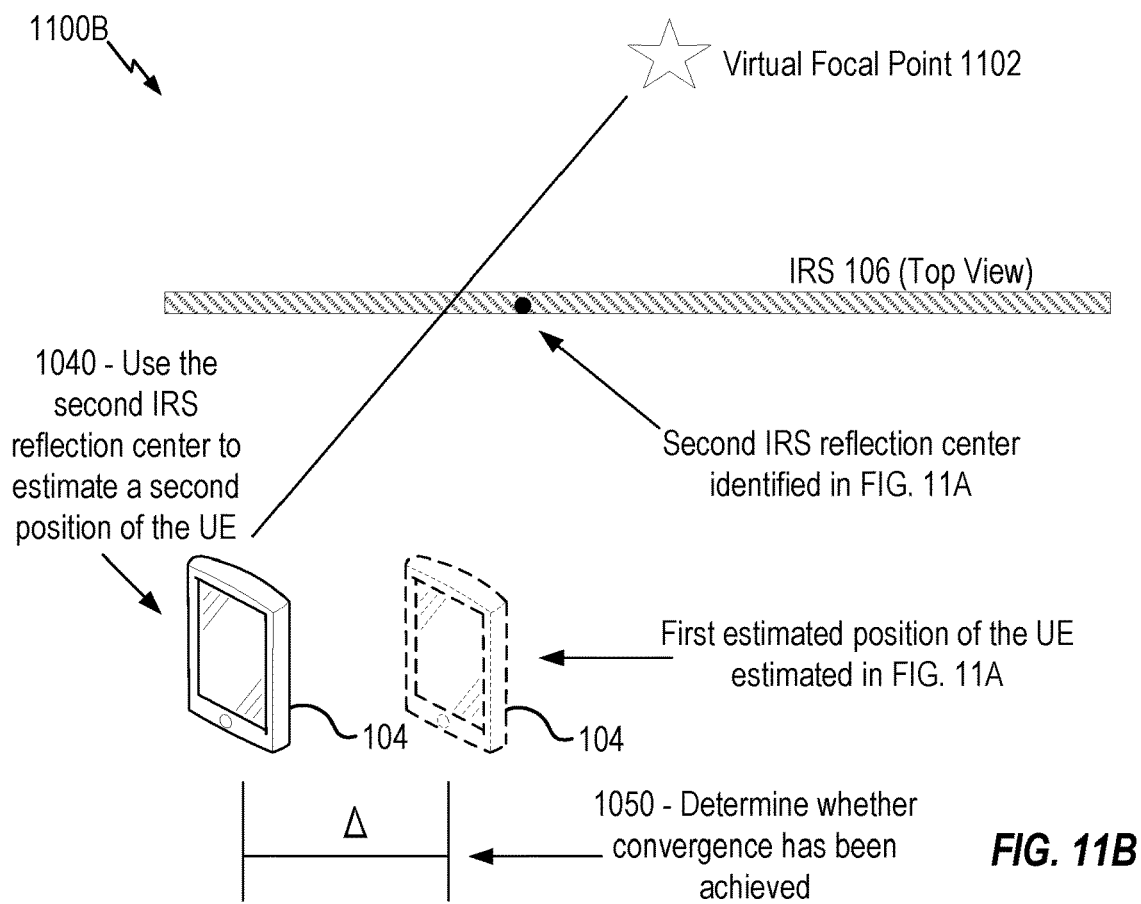

Operations 1000 may be understood with respect to the example provided in FIGS. 11A and 11B. In particular, FIGS. 11A and 11B provide an example 1100A, 1100B, respectively, illustrating iterative techniques for determining a precise IRS reflection center for an IRS, in accordance with certain aspects of the present disclosure.

As illustrated in FIG. 11A, a virtual focal point 1102 may be situated behind an IRS 106 (e.g., such as IRS 106 illustrated in FIGS. 1, 2, and 4B). A surface phase for the IRS may be set, based on the location of the virtual focal point, such that defocused beams are produced, in this example. Similar to 1010 in FIG. 10, as a first step, a UE 104 (e.g., such as UE 104 illustrated in FIGS. 1, 2, and 4B) may identify a first IRS reflection center as the center (e.g., origin for the X axis and Y axis) of IRS 106. UE 104 may use the center of IRS 106 in calculating a first estimated position of UE 104 illustrated in FIG. 11A.

Similar to 1030 in FIG. 10, as a next step, UE 104 may identify a second IRS reflection center of IRS 106. In certain aspects, to identify the second IRS reflection center, a straight line may be drawn between virtual focal point 1102 and the previously estimated position of UE 104 (e.g., in this case, the first estimated position of UE 104). The second IRS reflection center may be the point on IRS 106 where the line intersects IRS 106. This intersection point on IRS 106 may be used as the second IRS reflection center.

In certain aspects (e.g., not illustrated in FIG. 11A), to identify the second IRS reflection center, UE 104 may identify an intersection point on IRS 106 for a straight line joining UE 104 at the previously estimated position and virtual focal point 1102. UE 104 may then calculate the second IRS reflection center for IRS 106 as a weighted average of a position of the intersection point on the IRS and one or more previous intersection points.

In certain aspects (e.g., not illustrated in FIG. 11A), UE 104 may determine the straight line joining UE 104 at the previously estimated position for UE 104 and virtual focal point 1102 does not intersect a surface area of IRS 106. For example, no intersection point exists on IRS 106 for the line drawn. Accordingly, in certain aspects, UE 104 may manipulate the previously estimated position of UE 104 to be an adjusted position of UE 104 and redraw the straight line (e.g., draw a second straight line) connecting virtual focal point 1102 to the adjusted position of UE 104 to find the new intersection point on IRS 106. In certain other aspects, UE 104 may manipulate the first IRS reflection center (e.g., as not the center of IRS 106, given this is the first iteration) and calculate a new first estimated position of UE 104, such that the new first estimated position of UE 104 is an adjusted position of UE 104. UE 104 may then redraw the straight line (e.g., draw a second straight line) connecting virtual focal point 1102 to the adjusted position of UE 104 to find the new intersection point on IRS 106. The new intersection point on IRS 106 may be used as the second IRS reflection center.

Similar to 1040 in FIG. 10, as a next step, UE 104 may estimate a second position of UE 104 based on, at least, the second IRS reflection center for IRS 106. The second estimated position of UE 104, using the second IRS reflection center for IRS 106, is illustrated in FIG. 11B.

Subsequently, UE 104 may determine whether convergence has been achieved (e.g., similar to 100 in FIG. 10). As mentioned, in certain aspects, convergence is achieved where a change in position of the UE, based on the second estimated position of the UE and a previously estimated position of the UE (e.g., the first estimated position of the UE), is less than a first threshold. Accordingly, as illustrated in FIG. 11B, where the delta between the first estimated position of the UE and the second estimated position of the UE is less than the first threshold, the second IRS reflection center is determined to be the precise point in space to use in estimating the position of UE 104. Accordingly, the second estimated position of the UE estimated using the second IRS reflection center may be determined to be the precise location of UE 104. On the other hand, where the delta is greater than the first threshold, UE 104 may determine third IRS reflection centers, estimate a third position of the UE using the third IRS reflection centers, and again determine whether convergence is achieved. UE 104 may continue performing these iterative steps until convergence is achieved.

Although not illustrated in FIG. 11B, in certain aspects, convergence may also be achieved where a change in location between the first IRS reflection center and the second IRS reflection center for IRS 106 is less than a second threshold.

As an alternative to the defocused case, in certain aspects, wireless signals, transmitted by a network entity and reflected from one or more IRSs, may be focused towards a receiver device (e.g., a UE) (referred to herein as the focused case). For the focused case, iterative methods may be used to precisely estimate the impulse response corresponding to the delay of a ray that is reflected at an IRS reflection center.

Figure 12A:
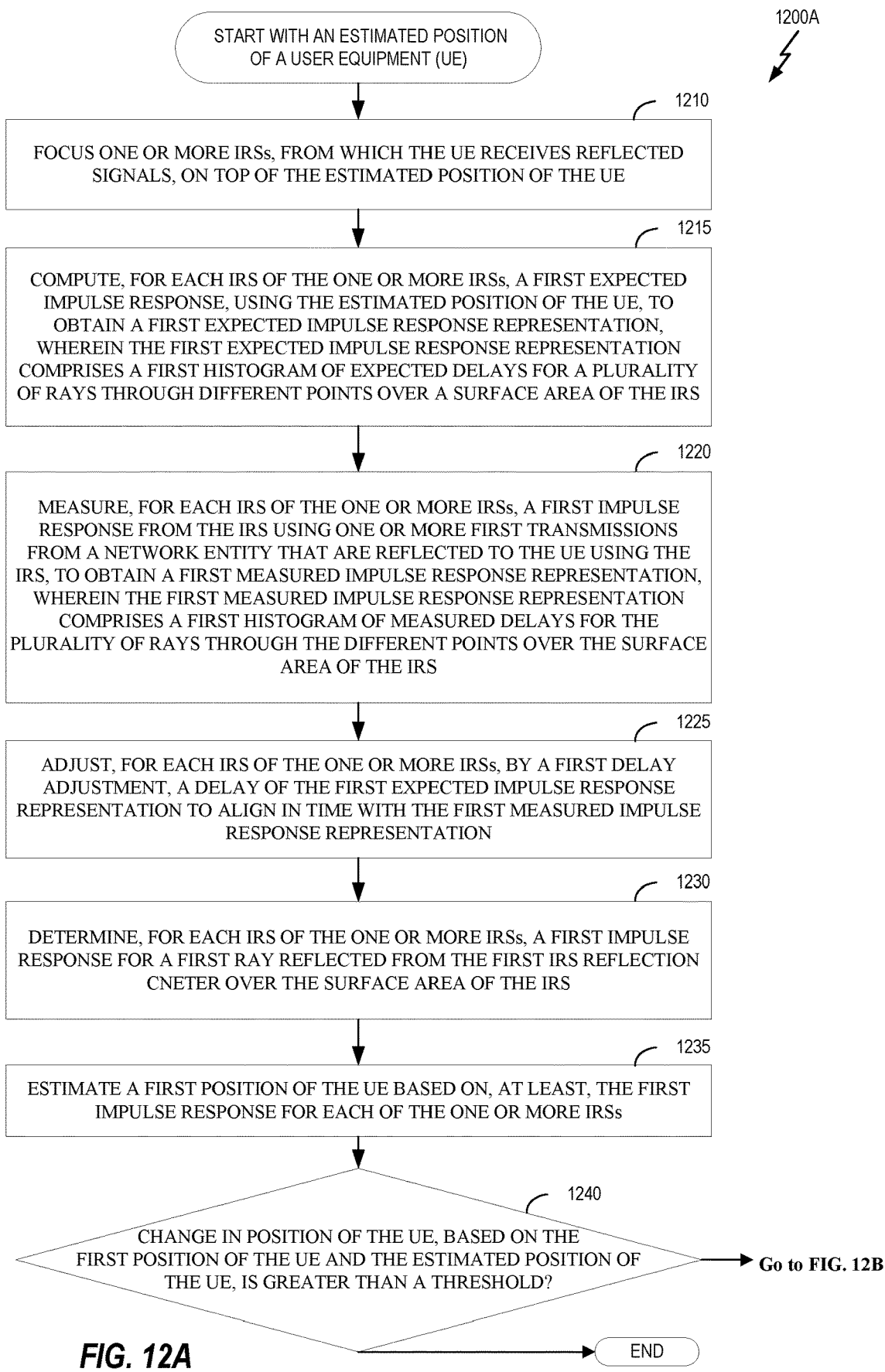
FIGS. 12A and 12B are a workflow illustrating example operations for determining IRS reflection center(s) for UE positioning in a focused case, in accordance with certain aspects of the present disclosure.
Figure 12B:
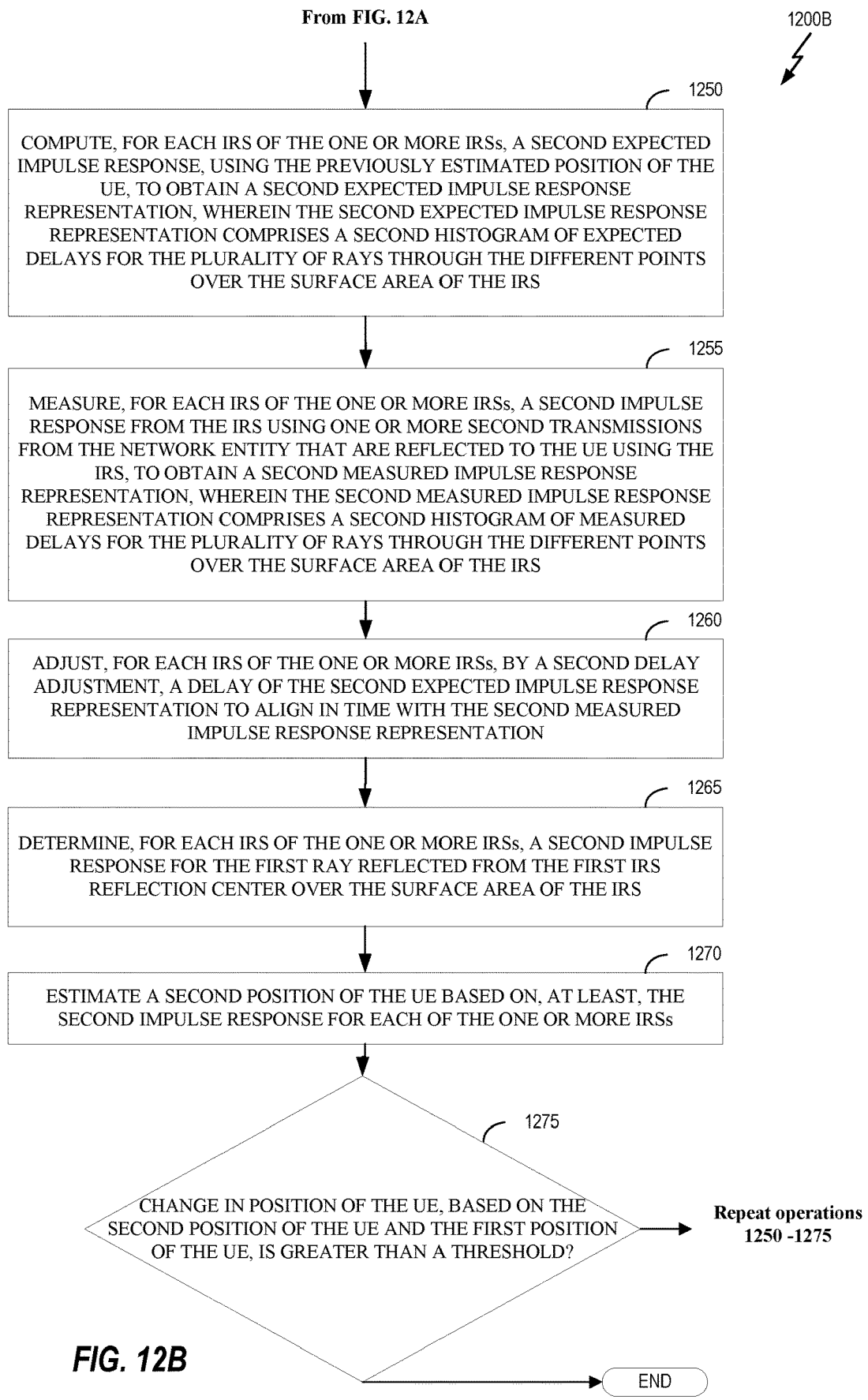

FIGS. 12A and 12B are a workflow illustrating example operations 1200 for determining IRS reflection center(s) for UE positioning in a focused case, in accordance with certain aspects of the present disclosure. In certain aspects, operations 1200 may be performed by a UE, for example, by UE 104 in wireless communication network 100.

Operations 1200 may be implemented as software components that are executed and run on one or more processors (e.g., controller/processor 280 of FIG. 2). Further, the transmission and reception of signals by the wireless node in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

As mentioned herein, in a focused case, to be able to set the surface phase of each IRS of one or more IRSs reflecting signals to a UE, such that the signals are focused towards the specific UE, a position of the UE may have been previously estimated. Accordingly, operations 1200 may begin, at operation 1210, by the UE setting the surface phase of each IRS such that each IRS is focused on top of the estimated position of the UE.

Figure 13:
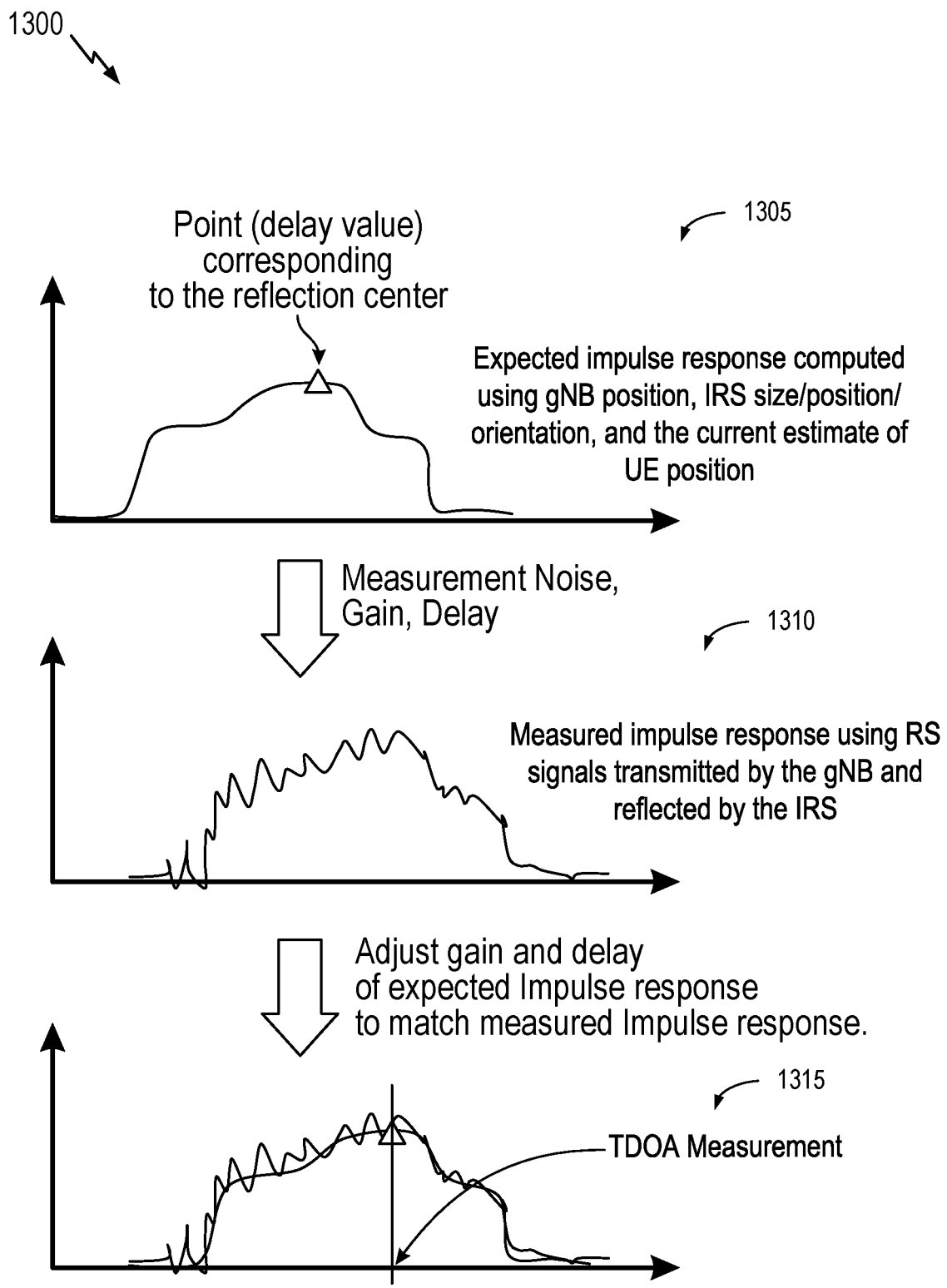
FIG. 13 is a diagram illustrating an example method for aligning an expected impulse response representation with a measured impulse response representation, in accordance with certain aspects of the present disclosure

At 1215, the UE computes, for each IRS, a first expected impulse response to obtain a first expected impulse response representation. The UE may use the estimated position of the UE to compute the first expected impulse response. The first expected impulse response representation may be a first histogram of expected delays for a plurality of rays through different points over a surface area of the corresponding IRS. An example of a first expected impulse representation is illustrated in FIG. 13 at 1305. In particular, FIG. 13 is a diagram 1300 illustrating an example method for aligning an expected impulse response representation with a measured impulse response representation, in accordance with certain aspects of the present disclosure. The UE may compute the first expected impulse response, to obtain the first expected impulse response representation, using known network entity position(s), known IRS size, position, and orientation, as well as, the current estimated position of the UE. On this impulse response representation, the UE may identify a point, or more specifically a delay value, corresponding a ray reflected from the IRS reflection center (indicated by a triangle in FIG. 13 at 1305). This point, or the delay value, can be referred to as the expected impulse response of the IRS reflection center.

At 1220, the UE measures, for each IRS, a first impulse response from the IRS using one or more first transmissions from a network entity that are reflected to the UE using the IRS, to obtain a first measured impulse response representation. The first measured impulse response representation may be a first histogram of measured delays for the plurality of rays through the different points over the surface area of the IRS. An example of a first measured impulse representation is illustrated in FIG. 13 at 1310.

At 1225, the UE adjusts, for each IRS, by a first delay adjustment, a delay of the first expected impulse response representation to align in time with the first measured impulse response representation. In particular, at 1225, the UE may adjust the gain and delay of the expected impulse response to match the measured impulse response, for example in a least-squares sense. Alignment of the first measured impulse response representation with the first expected impulse response representation is illustrated in FIG. 13 at 1315. The point on the adjusted expected impulse response corresponding to a ray that is reflected from the IRS reflection center is indicated by a triangle. This point, or the associated delay value, may be referred to as the impulse response of the IRS reflection center.

At 1230, the UE determines, for each IRS, a first impulse response for a first ray reflected from the first IRS reflection center over the surface area of the IRS. This first point may be used as a reflection center for the focused case, and will remain fixed throughout the iterative process. As mentioned, the measured impulse response representation provides a graphical display of measured delays mapped to different rays through different points over a surface area of the corresponding IRS. For example, a center point on the histogram might represent a measured impulse response for a center point on a corresponding IRS, while edge points on the histogram might represent measured impulse responses for points along the edges of the IRS. Thus, at 1230, the UE may determine a first impulse response for a first point (e.g., the selected reflection center) on the IRS using the histogram.

Subsequently, at 1235, the UE estimates a first position of the UE based on, at least, the first impulse response each of the one or more IRSs. In certain aspects, the UE estimates the first position of the UE using TDOA measurements of different signals reflected from the one or more IRSs, the signals being transmitted by one or more network entities. In calculating the first position of the UE, the UE may have knowledge of (1) a position of each of the one or more network entities transmitting signals reflected from each IRS to the UE and (2) a position, an orientation, and a size of each IRS. In setting up the positioning equations for the UE, the UE may use TDOA corresponding to the reflection center and the associated first impulse response for each IRS At 1240, the UE determines whether convergence has been achieved. In certain aspects, convergence is achieved where a change in position of the UE, based on the first estimated position of the UE and the previously estimated position of the UE (e.g., the estimated position of the UE known by the UE prior to operations 1200), is less than a first threshold. The first threshold may be any number greater than zero, and in some cases, may be preconfigured.

Where, at 1240, convergence has been achieved, operations 1200 may be complete. In other words, the (TDOA of) the first impulse response on the expected impulse responses has been precisely determined. The UE position estimated using such IRS reflection centers, and such impulse responses, may be used.

On the other hand, where at 1240, convergence has not been achieved, at 1250 (e.g., illustrated in FIG. 12B), the UE computes, for each IRS, a second expected impulse response to obtain a second expected impulse response representation. The second expected impulse response representation may be a second histogram of expected delays for the plurality of rays through the different points over the surface area of the IRS. The UE may compute the second expected impulse response using known network entity position(s), known IRS size, position, and orientation, as well as, the previously estimated (e.g., the most recently estimated) position of the UE (e.g., at this point in the workflow, the first position of the UE estimated at 1235).

At 1255, the UE measures, for each IRS, a second impulse response from the IRS using one or more second transmissions from the network entity that are reflected to the UE using the IRS, to obtain a second measured impulse response representation. The second measured impulse response representation may be a second histogram of measured delays for the plurality of rays through the different points over the surface area of the IRS.

At 1260, the UE adjusts, for each IRS, by a second delay adjustment, a delay of the second expected impulse response representation to align in time with the second measured impulse response representation. In particular, at 1260, the UE may adjust the gain and delay of the expected impulse response to match the measured impulse response, for example in a least-squares sense.

At 1265, the UE determines, for each IRS, a second impulse response for the first ray reflected from the first IRS reflection center over the surface area of the IRS. Subsequently, at 1270, the UE estimates the second position of the UE is based on, at least, the second impulse response for each of the one or more IRSs. In certain aspects, the UE estimates the second position of the UE using TDOA measurements of different signals reflected from the one or more IRSs, the signals being transmitted by one or more network entities. In calculating the second position of the UE, the UE may have knowledge of (1) a position of each of the one or more network entities transmitting signals reflected from each IRS to the UE and (2) a position, an orientation, and a size of each IRS.

At 1275, the UE determines whether convergence has been achieved. In certain aspects, convergence is achieved where a change in position of the UE, based on the second estimated position of the UE (e.g., estimated at 1270) and the previously estimated position of the UE (e.g., the first estimated position of the UE estimated at 1235), is less than the first threshold.

Where, at 1275, convergence has been achieved, operations 1200 may be complete. In other words, the precise expected impulse response, and hence the TDOA of the second impulse response of a ray reflected from the reflection center has been determined, and the UE position previously estimated may be used.

On the other hand, where at 1275, convergence has not been achieved, operations 1250-1275 may be repeated to (1) compute a new expected impulse response, using a previously estimated position of the UE, to obtain a new expected impulse response representation, (2) measure a new impulse response from the IRS to obtain a new measured impulse response representation, (3) align the new expected impulse response and the new measured impulse response to determine a new second impulse response for a first ray reflected from the IRS reflection center for each IRS, (4) use the TDOA corresponding to the new second impulse response for each IRS to calculate a new estimated position of the UE, and determine whether convergence has been achieved. Operations 245-1275 may be iteratively performed until convergence is achieved.

In certain aspects, the iterative steps illustrated in FIG. 10 (e.g., used in determining IRS reflection center(s) for UE positioning in defocused cases) may be performed in combination with the iterative steps illustrated in FIGS. 12A and 12B (e.g., used in determining IRS reflection center(s) for UE positioning in defocused cases). In particular, the iterative steps illustrated in FIG. 10 may be performed prior to the iterative steps illustrated in FIGS. 12A and 12B. The iterative steps for the defocused case may be initially used to determine an estimated position of the UE. This estimated position of the UE may allow for focusing of signals on the estimated position of the UE, such that iterative steps for the focused case may be performed, given the focused case requires an initial estimate/knowledge of the UE's position. In certain aspects, performing iterative steps for the focused case after performing iterative steps for the defocused case may provide improved results, in terms of IRS position and UE position estimation precision, due to the higher energy gain of focused signals as compared to defocused signals.

Alternatively, in certain aspects, after performing iterative steps for the defocused case, the UE may assume an intermediate position of the UE as the second position of the UE determined by the iterative steps illustrated in FIG. 10. The UE may focus the one or more IRSs on top of the second position of the UE, measure an impulse response of different signals reflected from the one or more IRSs, the signals being transmitted by one or more network entities, and estimate a third position of the UE using TDOA measurements using third IRS reflection centers for the one or more IRSs, wherein the third IRS reflections centers for the one or more IRSs are at a center of each of the one or more IRS and a peak point on the impulse response. This may be one case where the IRS position is further refined using focusing techniques; however, in this case, beam-squint mitigating techniques may be used when estimating the third position of the UE using TDOA measurements such that a peak point on the impulse response may be used for determining the UE's position.

As an alternative to the defocused case, the focused case, and the combination of the defocused case with the focused case, in certain aspects, wireless signals, transmitted by a network entity and reflected from one or more IRSs, may be focused at a focal point at any arbitrary location (e.g., a real focal point), other than the UE's location (referred to herein as the general case). For the general case, iterative methods may be used to precisely determine IRS reflection centers for one or more IRSs (e.g., an IRS reflection center per IRS, where the IRS reflection center may be different for each IRS) to be used for estimating the position of a UE. Further, iterative methods may be used to determine the impulse response corresponding to the delay of a ray that passes through the determined IRS reflection center.

In the general case, an estimated position of the UE may not be known and the surface phase of each IRS of one or more IRSs reflecting signals to a UE is set such that the signals are focused towards the focal point. In certain aspects, the focal point may be a real focal point. In certain aspects, the focal point may be a virtual focal point.

Figure 14A:
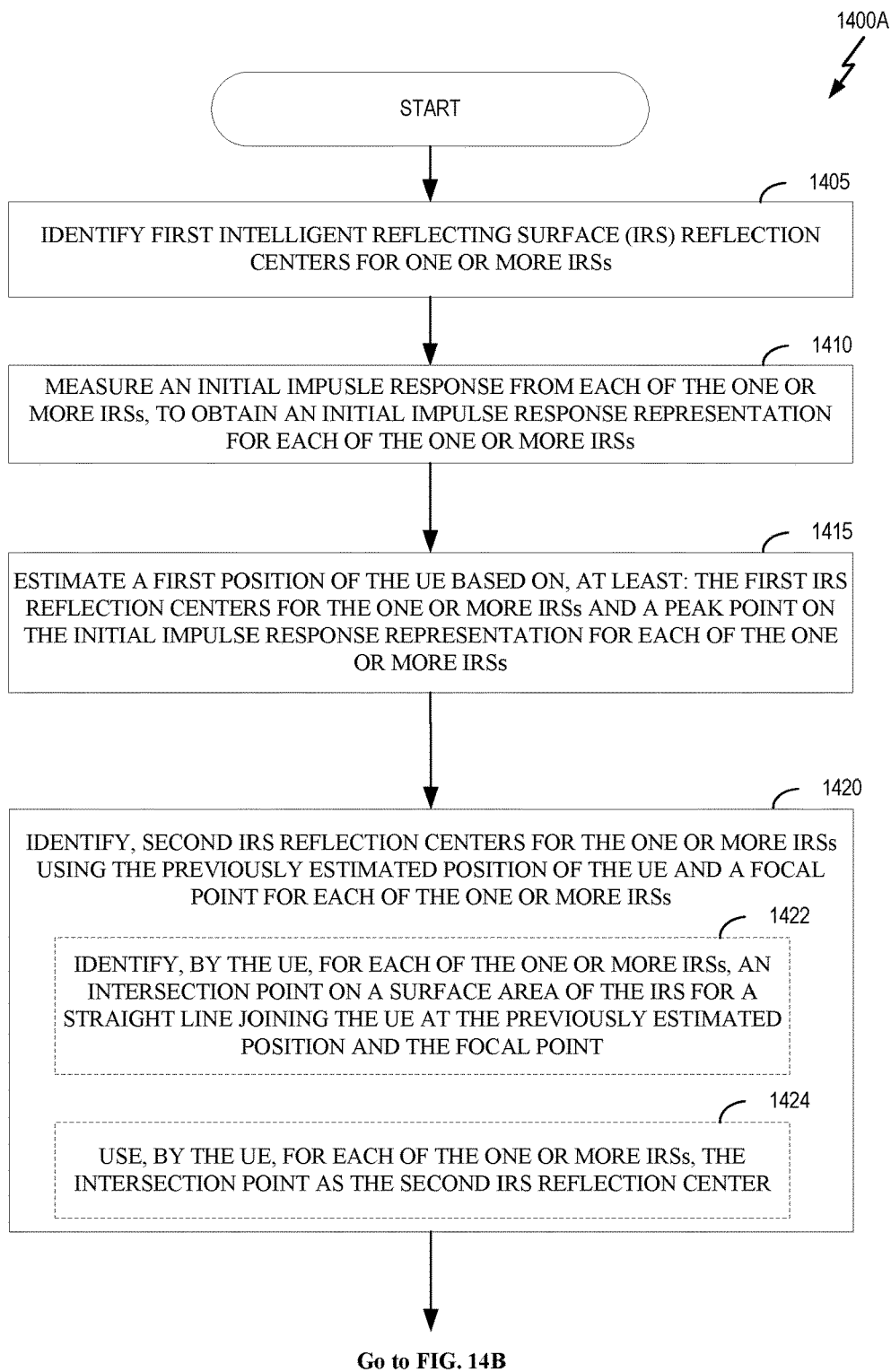
FIGS. 14A and 14B are a workflow illustrating example operations for determining IRS reflection center(s) for UE positioning in a general case, in accordance with certain aspects of the present disclosure.
Figure 14B:
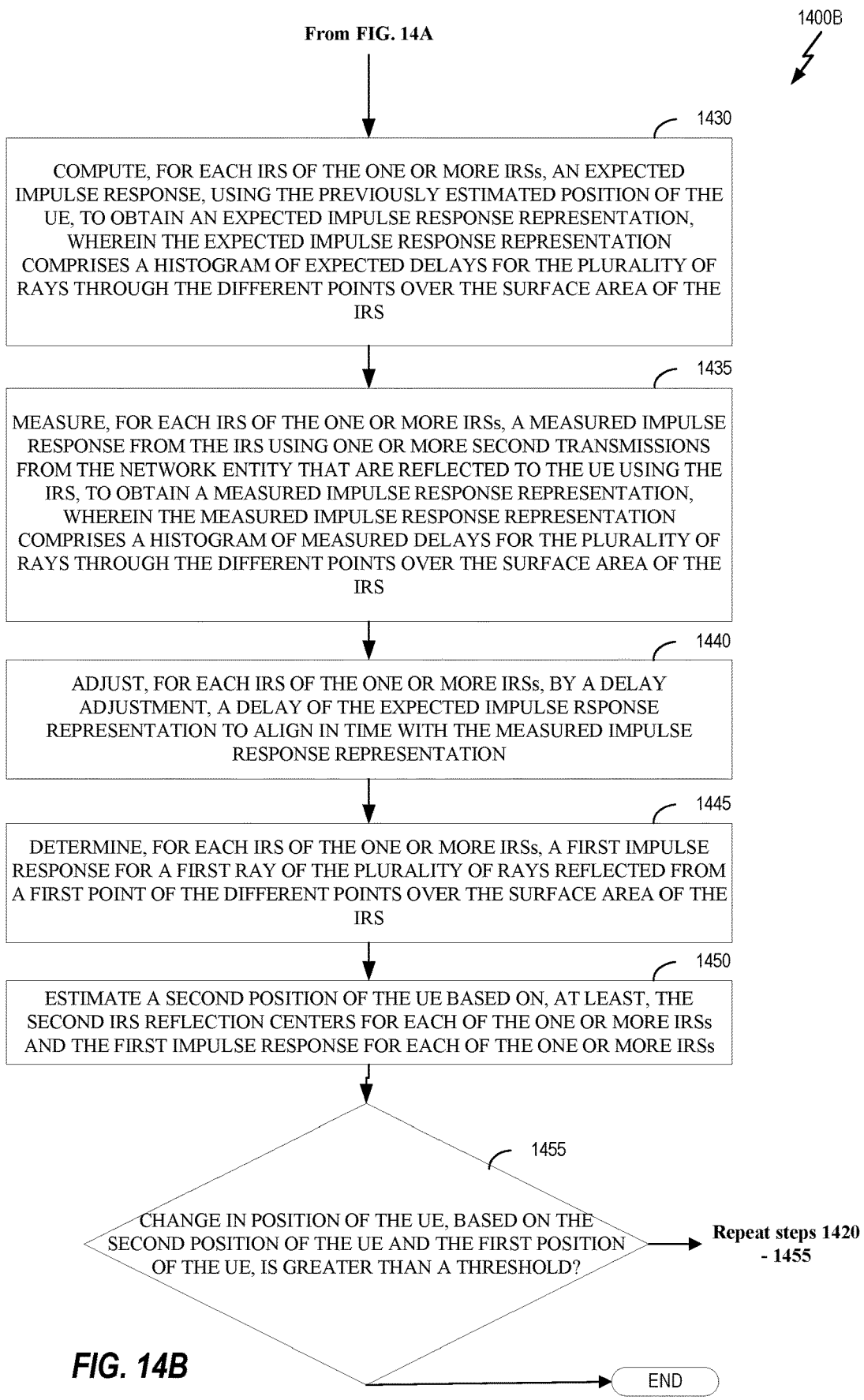

FIGS. 14A and 14B are a workflow illustrating example operations 1400 for determining IRS reflection center(s) for UE positioning in a general case, in accordance with certain aspects of the present disclosure. In certain aspects, operations 1400 may be performed by a UE, for example, by UE 104 in wireless communication network 100.

Operations 1400 may be implemented as software components that are executed and run on one or more processors (e.g., controller/processor 280 of FIG. 2). Further, the transmission and reception of signals by the wireless node in operations 1400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1400 may begin, at 1405, by the UE identifying first IRS reflection centers for one or more IRSs as a center of each of the one or more IRSs. For example, where four IRSs are being used for positioning, the UE may identify four IRS centers, e.g., one IRS center per IRS. The center of each IRS may be used as a starting point for determining the precise location of the IRS reflection center using iterative methods, as described in the following operations of FIG. 14.

At operation 1410, the UE measures an initial impulse response from each of the one or more IRSs, to obtain an initial impulse response representation for each of the one or more IRSs. At operation 1415, the UE estimates a first position of the UE based on, at least: the first IRS reflection centers for the one or more IRSs and a peak point on the initial impulse response representation for each of the one or more IRSs. In certain aspects, the UE estimates the first position of the UE using TDOA measurements of different signals reflected from the one or more IRSs, the signals being transmitted by one or more network entities. In calculating the first position of the UE, the UE may have knowledge of (1) a position of each of the one or more network entities transmitting signals reflected from each IRS to the UE and (2) a position, an orientation, and a size of each IRS.

At operation 1420, the UE identifies second IRS reflection centers for the one or more IRSs using a previously estimated position of the UE and a focal point for each of the one or more IRSs. The identified second IRS reflection centers may be different or the same for each of the one or more IRSs. For example, using the previous example, the UE may identify four second IRS reflection centers, e.g., one second IRS reflection center per IRS, where each second IRS reflection center is different or the same as a second IRS reflection of one or more of the four IRSs.

In certain aspects, the UE identifies the second IRS reflection centers for the one or more IRSs by, (1) at 1422, identifying an intersection point on a surface area of the IRS for an (infinitely) straight line passing through the UE at the previously estimated position and the focal point and, (2) at 1424, using the intersection point as the second IRS reflection center. For example, the UE may (1) produce an estimate of an intersection point on a first IRS, of the one or more IRSs, for a straight line passing through the previously estimated position of the UE (e.g., the first position of the UE) and the focal point and (2) use this intersection point as the second IRS reflection center for the first IRS. Further, the UE may (1) produce an estimate of an intersection point on a second IRS, of the one or more IRSs, for a straight line passing through the previously estimated position of the UE (e.g., the first position of the UE) and focal point for the second IRS and (2) use this intersection point as the second IRS reflection center for the first IRS. The UE may perform such steps for each IRS until a second IRS reflection center is estimated for each of the IRSs.

In certain aspects (e.g., not illustrated in FIG. 14A), to identify the second IRS reflection center, UE 104 may identify an intersection point on the IRS for a straight line passing through the UE at the previously estimated position and the focal point. The UE may then calculate the second IRS reflection center for the IRS as a weighted average of a position of the intersection point on the IRS and one or more previously estimated positions of the intersection points.

In certain aspects (e.g., not illustrated in FIG. 14A), the UE may determine the straight line passing through the UE at the previously estimated position for UE and the focal point does not intersect a surface area of IRS. For example, no intersection point exists on the IRS for the line drawn. Accordingly, in certain aspects, the UE may manipulate the previously estimated position of UE to be an adjusted position of the UE and redraw the straight line (e.g., draw a second straight line) connecting focal point to the adjusted position of UE to find the new intersection point on the IRS. In certain other aspects, the UE may manipulate the first IRS reflection center and calculate a new first estimated position of the UE, such that the new first estimated position of the UE is an adjusted position of the UE. The UE may then redraw the straight line (e.g., draw a second straight line) connecting the focal point to the adjusted position of the UE to find the new intersection point on the IRS. The new intersection point on the IRS may be used as the second IRS reflection center.

At 1430, the UE computes, for each IRS, an expected impulse response to obtain an expected impulse response representation. The expected impulse response representation may be a histogram of expected delays for the plurality of rays through the different points over the surface area of the IRS. The UE may compute the expected impulse response using known network entity position(s), known IRS size, position, and orientation, as well as, the previously estimated (e.g., the most recently estimated) position of the UE (e.g., at this point in the workflow, the first position of the UE estimated at 1415).

At 1435, the UE measures, for each IRS, a measured impulse response from the IRS using one or more second transmissions from the network entity that are reflected to the UE using the IRS, to obtain a measured impulse response representation. The measured impulse response representation may be a histogram of measured delays for the plurality of rays through the different points over the surface area of the IRS.

At 1440, the UE adjusts, for each IRS, by a delay adjustment, a delay of the expected impulse response representation to align in time with the measured impulse response representation. In particular, at 1440, the UE may adjust the gain and delay of the expected impulse response to match the measured impulse response, for example in a least-squares sense.

At 1445, the UE determines, for each IRS, a first impulse response for a first ray of the plurality of rays reflected from a first point (e.g., the estimated reflection center) of the different points over the surface area of the IRS. Subsequently, at 1450, the UE estimates a second position of the UE based on, at least, the second IRS reflection centers for each of the one or more IRSs and the second impulse response for each of the one or more IRSs. In certain aspects, the UE estimates the second position of the UE using TDOA measurements of different signals reflected from the one or more IRSs, the signals being transmitted by one or more network entities. In calculating the second position of the UE, the UE may have knowledge of (1) a position of each of the one or more network entities transmitting signals reflected from each IRS to the UE and (2) a position, an orientation, and a size of each IRS.

At 1455, the UE determines whether convergence has been achieved. In certain aspects, convergence is achieved where a change in position of the UE, based on the second estimated position of the UE and the previously estimated position of the UE (e.g., the first estimated position of the UE estimated at 1415), is less than a first threshold.

Where, at 1455, convergence has been achieved, operations 14000 may be complete. In other words, the precise location of the IRS reflection center for each IRS of the one or more IRSs has been determined, and the UE position estimated using such IRS reflection centers may be used.

On the other hand, where at 1455, convergence has not been achieved, operations 1420-1455 may be repeated to (1) identify new IRS reflection centers using the previously estimated position of the UE (e.g., previously estimated at 1450), (2) compute a new expected impulse response, using the previously estimated position of the UE, to obtain a new expected impulse response representation, (3) measure a new impulse response from the IRS to obtain a new measured impulse response representation, (4) align the new expected impulse response and the new measured impulse response to determine a new point for each IRS, (5) use the new point for each IRS to calculate a new estimated position of the UE, and determine whether convergence has been achieved. Operations 1420-1455 may be iteratively performed until convergence is achieved.

Figure 15:
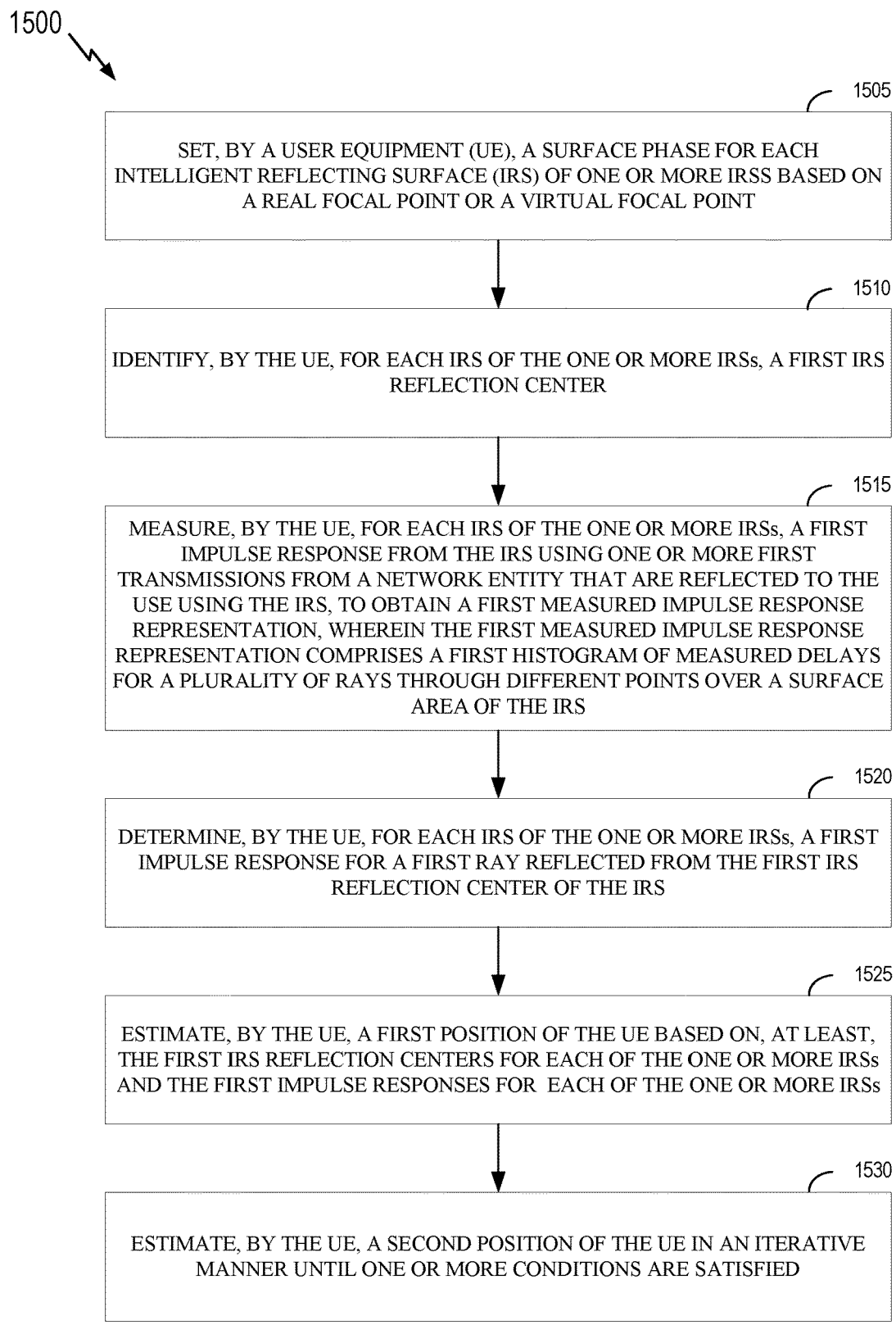
FIG. 15 is a flow diagram illustrating example operations for wireless communication by a UE, in accordance with certain aspects of the present disclosure.

FIG. 15 is a flow diagram illustrating example operations 1500 for wireless communication by a UE, in accordance with certain aspects of the present disclosure. In certain aspects, operations 1500 may be performed by a UE, for example, by UE 104 in wireless communication network 100.

Operations 1500 may be implemented as software components that are executed and run on one or more processors (e.g., controller/processor 280 of FIG. 2). Further, the transmission and reception of signals by the wireless node in operations 1400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1500 may begin, at 1505, by the UE setting a surface phase for each IRS of one or more IRSs based on a real focal point or a virtual focal point.

At 1510, the UE identifies, for each IRS of the one or more IRSs, a first IRS reflection center. At 1515, the UE measures, for each IRS of the one or more IRSs, a first impulse response from the IRS using one or more first transmissions from a network entity that are reflected to the UE using the IRS, to obtain a first measured impulse response representation, wherein the first measured impulse response representation comprises a first histogram of measured delays for a plurality of rays through different points over a surface area of the IRS.

At 1520, the UE determines, for each IRS of the one or more IRSs, a first impulse response for a first ray reflected from the first IRS reflection center of the IRS. At 1525, the UE estimates a first position of the UE based on, at least, the first IRS reflection centers for each of the one or more IRSs and the first impulse responses for each of the one or more IRSs.

At 1530, the UE estimates a second position of the UE in an iterative manner until one or more conditions are satisfied. In certain aspects, estimating the second position of the UE includes: for each IRS of the one or more IRSs, identifying a second IRS reflection center, measuring a second impulse response from the IRS using one or more second transmissions from the network entity that are reflected to the UE using the IRS, to obtain a second measured impulse response representation, wherein the second measured impulse response representation comprises a second histogram of measured delays for the plurality of rays through the different points over the surface area of the IRS, determining a second impulse response for a second ray reflected from the second IRS reflection center of the IRS, and estimating the second position of the UE based on, at least, the second IRS reflection centers for each of the one or more IRSs and the second impulse responses for each of the one or more IRSs.

Example Wireless Communication Devices

Figure 16:
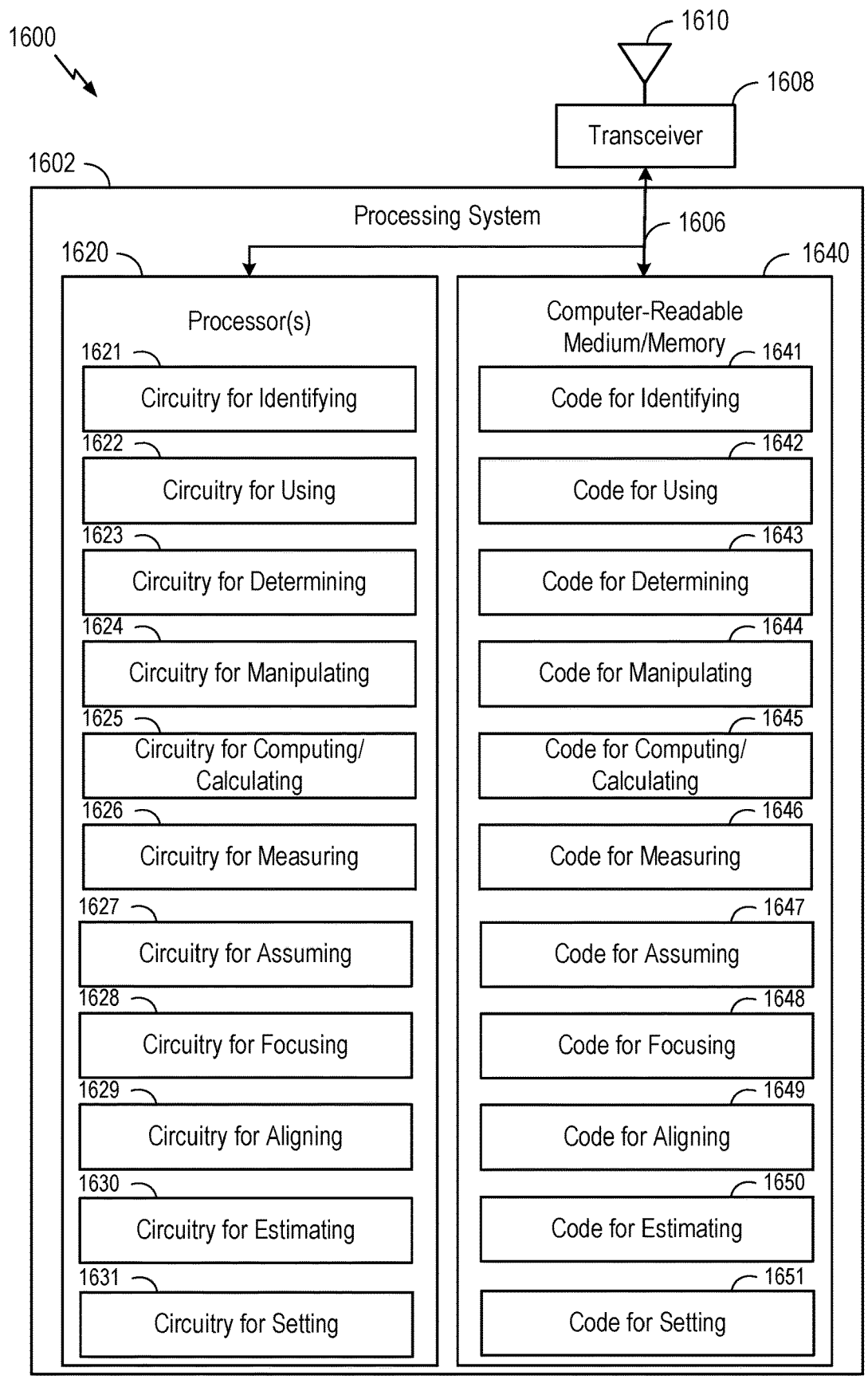
FIG. 16 depicts aspects of an example communications device.

FIG. 16 depicts an example communications device 1600 that includes various components operable, configured, or adapted to perform operations for the techniques disclosed herein, such as the operations depicted and described with respect to FIGS. 10, 12A, 12B, 14A, 14B, and 15. In some examples, communication device 1600 may be a UE 104 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1640 via a bus 1606. In certain aspects, computer-readable medium/memory 1640 is configured to store instructions (e.g., computer-executable code) that when executed by the one or more processors 1520, cause the one or more processors 1620 to perform the operations illustrated in FIGS. 10, 12A, 12B, 14A. 14B, and 15, or other operations for performing the various techniques discussed herein for IRS aided UE positioning.

In the depicted example, computer-readable medium/memory 1640 stores code 1641 for identifying, code 1642 for using, code 1643 for determining, code 1644 for manipulating, code 1645 for computing/calculating, code 1646 for measuring, code 1647 for assuming, code 1648 for focusing, code 1649 for aligning, code 1650 for estimating, and code 1651 for setting.

In the depicted example, the one or more processors 1620 include circuitry configured to implement the code stored in the computer-readable medium/memory 1640, including circuitry 1621 for identifying, circuitry 1622 for using, circuitry 1623 for determining, circuitry 1624 for manipulating, circuitry 1625 for computing/calculating, circuitry 1626 for measuring, circuitry 1627 for assuming, circuitry 1628 for focusing, circuitry 1629 for aligning, circuitry 1630 for estimating, and circuitry 1631 for setting.

Various components of communications device 1600 may provide means for performing the methods described herein, including with respect to FIGS. 10, 12A, 12B, 14A. 14B, and 15.

In some examples, means for transmitting or sending (or means for outputting for transmission) may include the transceivers 254 and/or antenna(s) 252 of the UE 104 illustrated in FIG. 2 and/or transceiver 1608 and antenna 1610 of the communication device 1600 in FIG. 16.

In some examples, means for receiving (or means for obtaining) may include the transceivers 254 and/or antenna(s) 252 of UE 104 illustrated in FIG. 2 and/or transceiver 1608 and antenna 1610 of the communication device 1600 in FIG. 16.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for identifying, means for using, means for determining, means for manipulating, means for computing/calculating, means for measuring, means for assuming, means for focusing, means for aligning, means for estimating, and means for setting may include various processing system components, such as: the one or more processors 1620 in FIG. 16, or aspects of UE 104 depicted in FIG. 2, including receive processor 258, transmit processor 264, TX MIMO processor 266, and/or controller/processor 280 (including positioning component 241).

Notably, FIG. 16 is an example, and many other examples and configurations of communication device 1600 are possible.

EXAMPLE CLAUSES

Implementation examples are described in the following numbered clauses:

Clause 1: A method for wireless communication by a user equipment (UE), comprising: setting a surface phase for each intelligent reflecting surface (IRS) of one or more IRSs based on a real focal point or a virtual focal point; for each IRS of the one or more IRSs: identifying a first IRS reflection center; measuring a first impulse response from the IRS using one or more first transmissions from a network entity that are reflected to the UE using the IRS, to obtain a first measured impulse response representation, wherein the first measured impulse response representation comprises a first histogram of measured delays for a plurality of rays through different points over a surface area of the IRS; determining a first impulse response for a first ray reflected from the first IRS reflection center of the IRS; estimating a first position of the UE based on, at least, the first IRS reflection centers for each of the one or more IRSs and the first impulse responses for each of the one or more IRSs; and estimating a second position of the UE in an iterative manner until one or more conditions are satisfied.

Clause 2: The method of Clause 1, wherein estimating the second position of the UE comprises: for each IRS of the one or more IRSs: identifying a second IRS reflection center; measuring a second impulse response from the IRS using one or more second transmissions from the network entity that are reflected to the UE using the IRS, to obtain a second measured impulse response representation, wherein the second measured impulse response representation comprises a second histogram of measured delays for the plurality of rays through the different points over the surface area of the IRS; determining a second impulse response for a second ray reflected from the second IRS reflection center of the IRS; and estimating the second position of the UE based on, at least, the second IRS reflection centers for each of the one or more IRSs and the second impulse responses for each of the one or more IRSs.

Clause 3: The method of any one of Clauses 1 or 2, wherein the one or more conditions comprise, at least one of: a change in position of the UE based on the second position of the UE and a previously estimated position of the UE is less than a first threshold, or a maximum number of iterations have been performed.

Clause 4: The method of any one of Clauses 1-3, wherein the one or more conditions further comprise: a change in location of each respective IRS reflection center for each IRS of the one or more IRSs is less than a second threshold.

Clause 5: The method of any one of Clauses 1-4, wherein: the first IRS reflection center identified for each IRS is identified as a center point of each IRS; the first impulse response determined for each IRS comprises a maximum impulse response represented as a peak impulse response in the first measured impulse response representation; and the first position of the UE position is estimated based on, at least, the center point of each IRS of the one or more IRSs and the maximum impulse response for each IRS of the one or more IRSs.

Clause 6: The method of any one of Clauses 2-5, wherein identifying the second IRS reflection center for each IRS comprises: identifying an intersection point on the surface area of the IRS for a straight line passing through the UE at: a previously estimated position of the UE and the focal point; or the previously estimated position of the UE and the virtual focal point; and using the intersection point as the second IRS reflection center.

Clause 7: The method of any one of Clauses 2-6, wherein identifying the second IRS reflection center for each IRS comprises: determining a first straight line passing through the UE at: a previously estimated position of the UE and the focal point; or the previously estimated position of the UE and the virtual focal point does not intersect the surface area of the IRS; manipulating the first IRS reflection center to estimate an adjusted position of the UE such that a second straight line passing through the UE at: the adjusted position of the UE and the focal point; or the adjusted position of the UE and the virtual focal point does intersect the surface area of the IRS at an intersection point; identifying the intersection point on the surface area of the IRS; and using the intersection point as the second IRS reflection center.

Clause 8: The method of any one of Clauses 2-7, wherein identifying the second IRS reflection center for each IRS comprises: determining a first straight line passing through the UE at: a previously estimated position of the UE and the focal point; or the previously estimated position of the UE and the virtual focal point does not intersect a surface area of the IRS; manipulating the previously estimated position of the UE to be an adjusted position of the UE such that a second straight line passing through the UE at: the adjusted position of the UE and the focal point; or the adjusted position of the UE and the virtual focal point does intersect the surface area of the IRS at an intersection point; identifying the intersection point on the surface area of the IRS; and using the intersection point as the second IRS reflection center.

Clause 9: The method of any one of Clauses 2-8, wherein identifying the second IRS reflection centers for the one or more IRSs using a previously estimated positon of the UE and the virtual focal point for each of the one or more IRSs comprises, for each of the one or more IRSs: determining a first straight line passing through the UE at the previously estimated position and the virtual focal point does not intersect the surface area of the IRS; manipulating the previously estimated position of the UE to be an adjusted position of the UE such that a second straight line passing through the UE at the adjusted position of the UE and the virtual focal point does intersect the surface area of the IRS at an intersection point; identifying the intersection point on the surface area of the IRS; and using the intersection point as the second IRS reflection center.

Clause 10: The method of any one of Clauses 2-9, wherein when the surface phase for each IRS of the one or more IRSs is set based on the real focal point, the second IRS reflection center identified for each IRS is identified as a center point of the surface area of each IRS.

Clause 11: The method of any one of Clauses 2-10, when the surface phase for each IRS of the one or more IRSs is set based on the real focal point, wherein the real focal point comprises a previously estimated position of the UE, the second IRS reflection center identified for each IRS is identified as a center point of the surface area of each IRS.

Clause 12: The method of any one of Clauses 2-11, wherein for each IRS: the second impulse response determined comprises a maximum impulse response represented as a peak impulse response in the second measured impulse response representation when beam-squint mitigating techniques are used for the IRS.

Clause 13: The method of any one of Clauses 2-12, wherein when the surface phase for each IRS of the one or more IRSs is set based on the virtual focal point, the second impulse response determined comprises a maximum impulse response represented as a peak impulse response in the second measured impulse response representation.

Clause 14: The method of any one of Clauses 2-13, wherein determining, for each IRS of the one or more IRSs, the second impulse response for the second ray reflected from the second IRS reflection center of the IRS comprises: computing an expected impulse response for the plurality of the rays through the different points over the surface area of the IRS, using a previously estimated position of the UE, to obtain an expected impulse response representation, wherein the expected impulse response representation comprises a histogram of expected delays for the plurality of the rays through the different points over the surface area of the IRS; identifying an expected impulse response, using the expected impulse response representation, as a delay value corresponding to a ray that is reflected at the second IRS reflection center; and adjusting, by a delay adjustment, a delay of the expected impulse response representation to align in time with the second measured impulse response representation, wherein the second impulse response is determined using the delay adjustment and the expected impulse response.

Clause 15: The method of any one of Clauses 1-14, wherein the UE estimates the first position of the UE using time difference of arrival (TDOA) measurements of different signals reflected from the one or more IRSs, the signals being transmitted by one or more network entities.

Clause 16: The method of any one of Clauses 2-15, wherein the UE estimates the first position and the second position of the UE using TDOA measurements of different signals reflected from the one or more IRSs, the signals being transmitted by one or more network entities.

Clause 17: The method of any one of Clauses 1-16, wherein the UE has knowledge of: a position for each network entity of one or more network entities transmitting signals reflected from the one or more IRSs to the UE; and a position, an orientation, and a size of each of the one or more IRSs.

Clause 18: A method for wireless communication by a user equipment (UE), comprising: identifying first intelligent reflecting surface (IRS) reflection centers for one or more IRSs as a center of each of the one or more IRSs; estimating a first position of the UE based on, at least, the first IRS reflection centers for the one or more IRSs; and estimating a second position of the UE in an iterative manner until at least one of: a change in position of the UE based on the second position of the UE and a previously estimated position of the UE is less than a first threshold, or a change in location of each respective IRS reflection center for each of the one or more IRSs is less than a second threshold, wherein estimating the second position of the UE in the iterative manner comprises: identifying second IRS reflection centers for the one or more IRSs using the previously estimated position of the UE and a virtual focal point for each of the one or more IRSs; and estimating the second position of the UE based on, at least, the second IRS reflection centers for the one or more IRSs.

Clause 19: The method of Clause 18, wherein identifying the second IRS reflection centers for the one or more IRSs using the previously estimated position of the UE and the virtual focal point for each of the one or more IRSs comprises, for each of the one or more IRSs: identifying an intersection point on a surface area of the IRS for a straight line joining the UE at the previously estimated position and the virtual focal point; and using the intersection point as the second IRS reflection center.

Clause 20: The method of any one of Clauses 18 or 19, wherein identifying the second IRS reflection centers for the one or more IRSs using the previously estimated position of the UE and the virtual focal point for each of the one or more IRSs comprises, for each of the one or more IRSs: determining a first straight line joining the UE at the previously estimated position and the virtual focal point does not intersect a surface area of the IRS; manipulating the first IRS reflection center to estimate an adjusted position of the UE such that a second straight line joining the UE at the adjusted position of the UE and the virtual focal point does intersect the surface area of the IRS at an intersection point; identifying the intersection point on the surface area of the IRS; and using the intersection point as the second IRS reflection center.

Clause 21: The method of any one of Clauses 18-20, wherein identifying the second IRS reflection centers for the one or more IRSs using the previously estimated position of the UE and the virtual focal point for each of the one or more IRSs comprises, for each of the one or more IRSs: determining a first straight line joining the UE at the previously estimated position and the virtual focal point does not intersect a surface area of the IRS; manipulating the previously estimated position of the UE to be an adjusted position of the UE such that a second straight line joining the UE at the adjusted position of the UE and the virtual focal point does intersect the surface area of the IRS at an intersection point; identifying the intersection point on the surface area of the IRS; and using the intersection point as the second IRS reflection center.

Clause 22: The method of any one of Clauses 18-21, wherein identifying the second IRS reflection centers for the one or more IRSs using the previously estimated position of the UE and the virtual focal point for each of the one or more IRSs comprises, for each of the one or more IRSs: identifying an intersection point on the IRS for a straight line joining the UE at the previously estimated position and the virtual focal point; and calculating the second IRS reflection center as a weighted average of a position of the intersection point on the IRS corresponding to one or more previously estimated positions of the UE.

Clause 23: The method of any one of Clauses 18-22, wherein the UE estimates the first position of the UE and the second position of the UE using time difference of arrival (TDOA) measurements of different signals reflected from the one or more IRSs, the signals being transmitted by one or more network entities.

Clause 24: The method of Clause 23, further comprising: measuring an impulse response to obtain an impulse response representation, wherein the UE uses a peak point on the impulse response representation for the different signals reflected from the one or more IRSs for the TDOA measurements.

Clause 25: The method of any one of Clauses 18-24, wherein the UE has knowledge of: a position for each network entity of one or more network entities transmitting signals reflected from the one or more IRSs to the UE; and a position, an orientation, and a size of each of the one or more IRSs.

Clause 26: The method of any one of Clauses 18-25, wherein a surface phase for each of the one or more IRSs is set based, at least in part, on a position of the virtual focal point.

Clause 27: The method of any one of Clauses 18-26, wherein immediately prior to estimating the first position of the UE, the UE is unaware of a position of the UE.

Clause 28: The method of any one of Clauses 18-27, further comprising: assuming an intermediate position of the UE as the second position; focusing the one or more IRSs on top of the second position of the UE; measuring an impulse response of different signals reflected from the one or more IRSs, the signals being transmitted by one or more network entities; and estimating a third position of the UE using TDOA measurements using: third IRS reflection centers for the one or more IRSs, wherein the third IRS reflections centers for the one or more IRSs are at a center of each of the one or more IRSs; and a peak point on the impulse response.

Clause 29: The method of Clause 28, wherein beam-squint mitigating techniques are used when estimating the third position of the UE using TDOA measurements.

Clause 30: The method of any one of Clauses 18-29, further comprising: assuming an intermediate position of the UE as the second position; focusing the one or more IRSs on top of the second position of the UE; for each IRS of the one or more IRSs: computing a first expected impulse response, using the second position of the UE, to obtain a first expected impulse response representation, wherein the first expected impulse response representation comprises a first histogram of expected delays for a plurality of rays through different points over a surface area of the IRS; measuring a first impulse response from the IRS using one or more first transmissions from a network entity that are reflected to the UE using the IRS, to obtain a first measured impulse response representation, wherein the first measured impulse response representation comprises a first histogram of measured delays for the plurality of rays through the different points over the surface area of the IRS; adjusting, by a first delay adjustment, a delay of the first expected impulse response representation to align in time with the first measured impulse response representation; and determining a first impulse response for a first ray reflected from the first reflection center over the surface area of the IRS; estimating a third position of the UE based on, at least, the first IRS reflection centers for each of the one or more IRSs and the first impulse responses for each of the one or more IRSs; determining a change in position of the UE based on the third position of the UE and the second position of the UE is greater than a third threshold; and estimating a fourth position of the UE in an iterative manner until the change in position of the UE based on the fourth position of the UE and a previously estimated position of the UE is less than the third threshold.

Clause 31: The method of Clause 30, wherein estimating the fourth position of the UE in the iterative manner comprises, for each of the one or more IRSs: computing a second expected impulse response using the previously estimated position of the UE, to obtain a second expected impulse response representation, wherein the second expected impulse response representation comprises a second histogram of expected delays for the plurality of rays through the different points over the surface area of the IRS; measuring a second impulse response from the IRS using one or more second transmissions from the network entity that are reflected to the UE using the IRS, to obtain a second measured impulse response representation, wherein the second measured impulse response representation comprises a second histogram of measured delays for the plurality of rays through the different points over the surface area of the IRS; adjusting, by a second delay adjustment, a delay of the second expected impulse response representation to align in time with the second measured impulse response representation; and determining a second impulse response for the first ray reflected from the first IRS reflection center over the surface area of the IRS, wherein estimating the fourth position of the UE based on, at least, the first IRS reflection centers for each of the one or more IRSs and the second impulse responses for each of the one or more IRSs.

Clause 32: The method of any one of Clauses 30 or 31, wherein the UE estimates the third position of the UE and the fourth position of the UE using TDOA measurements of different signals reflected from the one or more IRSs, the signals being transmitted by one or more network entities.

Clause 33: A method for wireless communication by a user equipment (UE), comprising: for each intelligent reflecting surface (IRS) of one or more IRSs focused on top of an estimated position of the UE and from which the UE receives reflected signals: computing a first expected impulse response, using the estimated position of the UE, to obtain a first expected impulse response representation, wherein the first expected impulse response representation comprises a first histogram of expected delays for a plurality of rays through different points over a surface area of the IRS; measuring a first impulse response from the IRS using one or more first transmissions from a network entity that are reflected to the UE using the IRS, to obtain a first measured impulse response representation, wherein the first measured impulse response representation comprises a first histogram of measured delays for the plurality of rays through the different points over the surface area of the IRS; adjusting, by a first delay adjustment, a delay of the first expected impulse response representation to align in time with the first measured impulse response representation; and determining a first impulse response for a first ray reflected from the first IRS reflection center over the surface area of the IRS; estimating a first position of the UE based on, at least, the first impulse response for each of the one or more IRSs; determining a change in position of the UE based on the first position of the UE and the estimated position of the UE is greater than a threshold; and estimating a second position of the UE in an iterative manner until the change in position of the UE based on the second position of the UE and a previously estimated position of the UE is less than the threshold.

Clause 34: The method of Clause 33, wherein estimating the second position of the UE in the iterative manner comprises, for each of the one or more IRSs: computing a second expected impulse response using the previously estimated position of the UE, to obtain a second expected impulse response representation, wherein the second expected impulse response representation comprises a second histogram of expected delays for the plurality of rays through the different points over the surface area of the IRS; measuring a second impulse response from the IRS using one or more second transmissions from the network entity that are reflected to the UE using the IRS, to obtain a second measured impulse response representation, wherein the second measured impulse response representation comprises a second histogram of measured delays for the plurality of rays through the different points over the surface area of the IRS; adjusting, by a second delay adjustment, a delay of the second expected impulse response representation to align in time with the second measured impulse response representation; and determining a second impulse response for the first ray reflected from the first IRS reflection center over the surface area of the IRS, wherein estimating the second position of the UE is based on, at least, the second impulse response for each of the one or more IRSs.

Clause 35: The method of any one of Clauses 33 or 34, wherein the UE estimates the first position of the UE and the second position of the UE using time difference of arrival (TDOA) measurements of different signals reflected from the one or more IRSs, the signals being transmitted by one or more network entities.

Clause 36: The method of any one of Clauses 33-35, wherein the UE has knowledge of: a position for each network entity of one or more network entities transmitting signals reflected from the one or more IRSs to the UE; and a position, an orientation, and a size of each of the one or more IRSs.

Clause 37: A method for wireless communication by a user equipment (UE), comprising: identifying first intelligent reflecting surface (IRS) reflection centers for one or more IRSs as a center of each of the one or more IRSs; measuring an initial impulse response from each of the one or more IRSs, to obtain an initial impulse response representation for each of the one or more IRSs; estimating a first position of the UE based on, at least: the first IRS reflection centers for the one or more IRSs and a peak point on the initial impulse response representation for each of the one or more IRSs; and estimating a second position of the UE in an iterative manner until a change in position of the UE based on the second position of the UE and a previously estimated position of the UE is less than a threshold, wherein estimating the second position of the UE in the iterative manner comprises: identifying second IRS reflection centers for the one or more IRSs using a previously estimated position of the UE and a focal point for each of the one or more IRSs; for each IRS of the one or more IRSs: computing an expected impulse response, using the previously estimated position of the UE, to obtain an expected impulse response representation, wherein the expected impulse response representation comprises a histogram of expected delays for a plurality of rays through different points over a surface area of the IRS; measuring a measured impulse response from the IRS using one or more transmissions from a network entity that are reflected to the UE using the IRS, to obtain a measured impulse response, wherein the measured impulse response representation comprises a histogram of measured delays for the plurality of rays through the different points over the surface area of the IRS; adjusting, by a delay adjustment, a delay of the expected impulse response representation to align in time with the measured impulse response representation; and determining a first impulse response for a first ray of the plurality of rays reflected from a first point of the different points over the surface area of the IRS; and estimating the second position of the UE based on, at least, the second IRS reflection centers for each of the one or more IRSs and the first impulse response for each of the one or more IRSs.

Clause 38: The method of Clause 37, wherein the focal point comprises a real focal point or a virtual focal point.

Clause 39: The method of any one of Clauses 37 or 38, wherein identifying the second IRS reflection centers for the one or more IRSs using the previously estimated positon of the UE and the focal point for each of the one or more IRSs comprises, for each of the one or more IRSs: identifying an intersection point on a surface area of the IRS for a straight line passing through the UE at the previously estimated position and the focal point; and using the intersection point as the second IRS reflection center.

Clause 40: The method of any one of Clauses 37-39, wherein the UE estimates the first position and the second position of the UE using time difference of arrival (TDOA) measurements of different signals reflected from the one or more IRSs, the signals being transmitted by one or more network entities.

Clause 41: The method of any one of Clauses 37-40, wherein the UE has knowledge of: a position for each network entity of one or more network entities transmitting signals reflected from the one or more IRSs to the UE; and a position, an orientation, and a size of the one or more IRSs.

Clause 42: The method of any one of Clauses 37-41, wherein identifying the second IRS reflection centers for the one or more IRSs using the previously estimated positon of the UE and the focal point for each of the one or more IRSs comprises, for each of the one or more IRSs: determining a first straight line passing through the UE at the previously estimated position and the focal point does not intersect a surface area of the IRS; manipulating the previously estimated position of the UE to be an adjusted position of the UE such that a second straight line passing through the UE at the adjusted position of the UE and the focal point does intersect the surface area of the IRS at an intersection point; and identifying the intersection point on the surface area of the IRS; and using the intersection point as the second IRS reflection center.

Clause 43: The method of any one of Clauses 37-42, wherein identifying the second IRS reflection centers for the one or more IRSs using the previously estimated positon of the UE and the focal point for each of the one or more IRSs comprises, for each of the one or more IRSs: determining a first straight line passing through the UE at the previously estimated position and the focal point does not intersect a surface area of the IRS; manipulating the first IRS reflection center to estimate an adjusted position of the UE such that a second straight line passing through the UE at the adjusted position of the UE and the focal point does intersect the surface area of the IRS at an intersection point; and identifying the intersection point on the surface area of the IRS; and using the intersection point as the second IRS reflection center.

Clause 44: The method of any one of Clauses 37-43, wherein identifying the second IRS reflection centers for the one or more IRSs using the previously estimated positon of the UE and the focal point for each of the one or more IRSs comprises, for each of the one or more IRSs: identifying an intersection point on the IRS for a straight line passing through the UE at the previously estimated position and the focal point; and calculating the second IRS reflection center as a weighted average of a position of the intersection point on the IRS and one or more previously estimated positions of the UE.

Clause 45: An apparatus, comprising: a memory comprising executable instructions; and one or more processors configured to execute the executable instructions and cause the apparatus to perform a method in accordance with any one of Clauses 1-44.

Clause 46: An apparatus, comprising means for performing a method in accordance with any one of Clauses 1-44.

Clause 47: A non-transitory computer-readable medium comprising executable instructions that, when executed by one or more processors of an apparatus, cause the apparatus to perform a method in accordance with any one of Clauses 1-44.

Clause 48: A computer program product embodied on a computer-readable storage medium comprising code for performing a method in accordance with any one of Clauses 1-44.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration. For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu \times 15$ kHz, where u is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of intelligent reflecting surface (IRS) aided user equipment (UE) positioning. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication by a user equipment (UE), comprising:
    setting a surface phase for each intelligent reflecting surface (IRS) of one or more IRSs based on a real focal point or a virtual focal point;
    for each respective IRS of the one or more IRSs:
        identifying a first IRS reflection center;
        measuring an impulse response from the respective IRS using one or more first transmissions from a network entity that are reflected to the UE using the respective IRS, to obtain a first measured impulse response representation, wherein the first measured impulse response representation comprises a first histogram of measured delays for a plurality of rays through different points over a surface area of the respective IRS;
        determining a first impulse response for a first ray reflected from the first IRS reflection center of the respective IRS;
    estimating a first position of the UE based on the first IRS reflection center and the first impulse response for each of the respective IRS of the one or more IRSs; and
    estimating a second position of the UE in an iterative manner until one or more conditions are satisfied.

2. The method of claim 1, wherein estimating the second position of the UE comprises:
    for each respective IRS of the one or more IRSs:
        identifying a second IRS reflection center;
        measuring another impulse response from the respective IRS using one or more second transmissions from the network entity that are reflected to the UE using the respective IRS, to obtain a second measured impulse response representation, wherein the second measured impulse response representation comprises a second histogram of measured delays for the plurality of rays through the different points over the surface area of the respective IRS;
        determining a second impulse response for a second ray reflected from the second IRS reflection center of the respective IRS; and
    estimating the second position of the UE based on the second IRS reflection center and the second impulse response for each of the respective IRS of the one or more IRSs.

3. The method of claim 2, wherein the identifying the second IRS reflection center for the respective IRS comprises:
    identifying an intersection point on the surface area of the respective IRS for a straight line passing through the UE at:
        a previously estimated position of the UE and the real focal point; or
        the previously estimated position of the UE and the virtual focal point; and
    using the intersection point as the second IRS reflection center.

4. The method of claim 2, wherein the identifying the second IRS reflection center for the respective IRS comprises:
    determining a first straight line passing through the UE at:
        a previously estimated position of the UE and the real focal point; or
        the previously estimated position of the UE and the virtual focal point does not intersect the surface area of the respective IRS;

manipulating the first IRS reflection center to estimate an adjusted position of the UE such that a second straight line passing through the UE at:
the adjusted position of the UE and the real focal point; or
the adjusted position of the UE and the virtual focal point does intersect the surface area of the respective IRS at an intersection point;
identifying the intersection point on the surface area of the respective IRS; and
using the intersection point as the second IRS reflection center.

5. The method of claim 2, wherein the identifying the second IRS reflection center for the respective IRS comprises:
determining a first straight line passing through the UE at:
a previously estimated position of the UE and the real focal point; or
the previously estimated position of the UE and the virtual focal point does not intersect the surface area of the respective IRS;
manipulating the previously estimated position of the UE to be an adjusted position of the UE such that a second straight line passing through the UE at:
the adjusted position of the UE and the real focal point; or
the adjusted position of the UE and the virtual focal point does intersect the surface area of the respective IRS at an intersection point;
identifying the intersection point on the surface area of the respective IRS; and
using the intersection point as the second IRS reflection center.

6. The method of claim 2, wherein the identifying the second IRS reflection center for each of the respective IRS of the one or more IRSs using a previously estimated position of the UE and the virtual focal point for each of the respective IRS of the one or more IRSs comprises, for each of the respective IRS of the one or more IRSs:
determining a first straight line passing through the UE at a previously estimated position and the virtual focal point does not intersect the surface area of the respective IRS;
manipulating the previously estimated position of the UE to be an adjusted position of the UE such that a second straight line passing through the UE at the adjusted position of the UE and the virtual focal point does intersect the surface area of the respective IRS at an intersection point;
identifying the intersection point on the surface area of the respective IRS; and
using the intersection point as the second IRS reflection center.

7. The method of claim 2, wherein when the surface phase for each of the respective IRS of the one or more IRSs is set based on the real focal point, the second IRS reflection center identified for the respective IRS is identified as a center point of the surface area of the respective IRS.

8. The method of claim 2, when the surface phase for each of the respective IRS of the one or more IRSs is set based on the real focal point, wherein the real focal point comprises a previously estimated position of the UE, the second IRS reflection center identified for the respective IRS is identified as a center point of the surface area of the respective IRS.

9. The method of claim 2, wherein for the respective IRS the second impulse response determined comprises a maximum impulse response represented as a peak impulse response in the second measured impulse response representation when beam-squint mitigating techniques are used for the respective IRS.

10. The method of claim 2, wherein when the surface phase for each of the respective IRS of the one or more IRSs is set based on the virtual focal point, the second impulse response determined comprises a maximum impulse response represented as a peak impulse response in the second measured impulse response representation.

11. The method of claim 2, wherein the determining, for each of the respective IRS of the one or more IRSs, the second impulse response for the second ray reflected from the second IRS reflection center of the respective IRS comprises:
computing an expected impulse response for the plurality of rays through the different points over the surface area of the respective IRS, using a previously estimated position of the UE, to obtain an expected impulse response representation, wherein the expected impulse response representation comprises a histogram of expected delays for the plurality of rays through the different points over the surface area of the respective IRS;
identifying the expected impulse response, using the expected impulse response representation, as a delay value corresponding to a ray that is reflected at the second IRS reflection center; and
adjusting, by a delay adjustment, a delay of the expected impulse response representation to align in time with the second measured impulse response representation, wherein the second impulse response is determined using the delay adjustment and the expected impulse response.

12. The method of claim 2, wherein the estimating the first position and the second position of the UE comprises using TDOA measurements of different signals reflected from the one or more IRSs, the signals being transmitted by one or more network entities.

13. The method of claim 1, wherein the one or more conditions comprise, at least one of:
a change in position of the UE based on the second position of the UE and a previously estimated position of the UE is less than a first threshold, or
a maximum number of iterations have been performed.

14. The method of claim 1, wherein the one or more conditions further comprise a change in location of each respective IRS reflection center for each of the respective IRS of the one or more IRSs is less than a second threshold.

15. The method of claim 1, wherein:
the first IRS reflection center identified for of the respective IRS is identified as a center point of the respective IRS;
the first impulse response determined for the respective IRS comprises a maximum impulse response represented as a peak impulse response in the first measured impulse response representation; and
the first position of the UE is estimated based on, at least, the center point of each of the respective IRS of the one or more IRSs and the maximum impulse response for each of the respective IRS of the one or more IRSs.

16. The method of claim 1, wherein the estimating the first position of the UE comprises using time difference of arrival (TDOA) measurements of different signals reflected from the one or more IRSs, the signals being transmitted by one or more network entities.

17. The method of claim 1, wherein the UE has knowledge of:
- a position for each network entity of one or more network entities transmitting signals reflected from the one or more IRSs to the UE; and
- a position, an orientation, and a size of each of the one or more IRSs.

18. A user equipment (UE) configured for wireless communication, comprising a processing system that includes one or more processors and one or more memories coupled with the one or more processors, the processing system configured to cause the UE to:
- set a surface phase for each intelligent reflecting surface (IRS) of one or more IRSs based on a real focal point or a virtual focal point;
- for each respective IRS of the one or more IRSs:
  - identify a first IRS reflection center;
  - measure an impulse response from the respective IRS using one or more first transmissions from a network entity that are reflected to the UE using the respective IRS, to obtain a first measured impulse response representation, wherein the first measured impulse response representation comprises a first histogram of measured delays for a plurality of rays through different points over a surface area of the respective IRS;
  - determine a first impulse response for a first ray reflected from the first IRS reflection center of the respective IRS;
- estimate a first position of the UE based on, at least, the first IRS reflection center and the first impulse response for each of the respective IRS of the one or more IRSs; and
- estimate a second position of the UE in an iterative manner until one or more conditions are satisfied.

19. The UE of claim 18, wherein to cause the UE to estimate the second position of the UE, the processing system is configured to cause the UE to:
- for each of the respective IRS of the one or more IRSs:
  - identify a second IRS reflection center;
  - measure another impulse response from the respective IRS using one or more second transmissions from the network entity that are reflected to the UE using the respective IRS, to obtain a second measured impulse response representation, wherein the second measured impulse response representation comprises a second histogram of measured delays for the plurality of rays through the different points over the surface area of the respective IRS;
  - determine a second impulse response for a second ray reflected from the second IRS reflection center of the respective IRS; and
- estimate the second position of the UE based on, at least, the second IRS reflection center and the second impulse response for each of the respective IRS of the one or more IRSs.

20. The UE of claim 19, wherein to cause the UE to identify the second IRS reflection center for the respective IRS, the processing system is configured to cause the UE to:
- identify an intersection point on the surface area of the respective IRS for a straight line passing through the UE at:
  - a previously estimated position of the UE and the real focal point; or
  - the previously estimated position of the UE and the virtual focal point; and
- use the intersection point as the second IRS reflection center.

21. The UE of claim 19, wherein to cause the UE to identify the second IRS reflection center for the respective IRS, the processing system is configured to cause the UE to:
- determine a first straight line passing through the UE at:
  - a previously estimated position of the UE and the real focal point; or
  - the previously estimated position of the UE and the virtual focal point does not intersect the surface area of the respective IRS;
- manipulate the first IRS reflection center to estimate an adjusted position of the UE such that a second straight line passing through the UE at:
  - the adjusted position of the UE and the real focal point; or
  - the adjusted position of the UE and the virtual focal point does intersect the surface area of the respective IRS at an intersection point;
- identify the intersection point on the surface area of the respective IRS; and
- use the intersection point as the second IRS reflection center.

22. The UE of claim 19, wherein to cause the UE to identify the second IRS reflection center for the respective IRS, the processing system is configured to cause the UE to:
- determine a first straight line passing through the UE at:
  - a previously estimated position of the UE and the real focal point; or
  - the previously estimated position of the UE and the virtual focal point does not intersect the surface area of the respective IRS;
- manipulate the previously estimated position of the UE to be an adjusted position of the UE such that a second straight line passing through the UE at:
  - the adjusted position of the UE and the real focal point; or
  - the adjusted position of the UE and the virtual focal point does intersect the surface area of the respective IRS at an intersection point;
- identify the intersection point on the surface area of the respective IRS; and
- use the intersection point as the second IRS reflection center.

23. The UE of claim 19, wherein to cause the UE to identify the second IRS reflection center for each of the respective IRS of the one or more IRSs using a previously estimated positon of the UE and the virtual focal point for each of the respective IRS of the one or more IRSs, the processing system is configured to cause the UE to, for each of the respective IRS of the one or more IRSs:
- determine a first straight line passing through the UE at a previously estimated position and the virtual focal point does not intersect the surface area of the respective IRS;
- manipulate the previously estimated position of the UE to be an adjusted position of the UE such that a second straight line passing through the UE at the adjusted position of the UE and the virtual focal point does intersect the surface area of the respective IRS at an intersection point;
- identify the intersection point on the surface area of the respective IRS; and
- use the intersection point as the second IRS reflection center.

24. The UE of claim 19, wherein when the surface phase for each of the respective IRS of the one or more IRSs is set based on the real focal point, the second IRS reflection center identified for the respective IRS is identified as a center point of the surface area of the respective IRS.

25. The UE of claim 19, when the surface phase for each of the respective IRS of the one or more IRSs is set based on the real focal point, wherein the real focal point comprises a previously estimated position of the UE, the second IRS reflection center identified for the respective IRS is identified as a center point of the surface area of the respective IRS.

26. The UE of claim 19, wherein for the respective IRS the second impulse response determined comprises a maximum impulse response represented as a peak impulse response in the second measured impulse response representation when beam-squint mitigating techniques are used for the respective IRS.

27. The UE of claim 18, wherein the one or more conditions comprise, at least one of:
  a change in position of the UE based on the second position of the UE and a previously estimated position of the UE is less than a first threshold, or
  a maximum number of iterations have been performed.

28. The UE of claim 18, wherein the one or more conditions further comprise a change in location of each respective IRS reflection center for each of the respective IRS of the one or more IRSs is less than a second threshold.

29. The UE of claim 18, wherein:
  the first IRS reflection center identified for the respective IRS is identified as a center point of the respective IRS;
  the first impulse response determined for the respective IRS comprises a maximum impulse response represented as a peak impulse response in the first measured impulse response representation; and
  the first position of the UE is estimated based on, at least, the center point of each of the respective IRS of the one or more IRSs and the maximum impulse response for each of the respective IRS of the one or more IRSs.

30. A non-transitory computer-readable medium comprising computer-executable instructions that, when executed by one or more processors of a user equipment (UE), cause the UE to perform a method of wireless communication, comprising:
  setting a surface phase for each intelligent reflecting surface (IRS) of one or more IRSs based on a real focal point or a virtual focal point;
  for each respective IRS of the one or more IRSs:
    identifying a first IRS reflection center;
    measuring an impulse response from the respective IRS using one or more first transmissions from a network entity that are reflected to the UE using the respective IRS, to obtain a first measured impulse response representation, wherein the first measured impulse response representation comprises a first histogram of measured delays for a plurality of rays through different points over a surface area of the respective IRS;
    determining a first impulse response for a first ray reflected from the first IRS reflection center of the respective IRS;
  estimating a first position of the UE based on the first IRS reflection center and the first impulse response for each of the respective IRS of the one or more IRSs; and
  estimating a second position of the UE in an iterative manner until one or more conditions are satisfied.

\* \* \* \* \*